US012203548B2

(12) United States Patent
Mesinovic et al.

(10) Patent No.: US 12,203,548 B2
(45) Date of Patent: Jan. 21, 2025

(54) TRANSMISSION ARRANGEMENT FOR A FLOOR SURFACING MACHINE COMPRISING A FIRST AND SECOND IDLE PULLEY, BOTH PIVOTABLE AROUND A COMMON PIVOT AXIS

(71) Applicant: HUSQVARNA AB, Huskvarna (SE)

(72) Inventors: Besim Mesinovic, Gothenburg (SE);
Oskar Pettersson, Ytterby (SE);
Andreas Fogelberg, Söderköping (SE)

(73) Assignee: HUSQVARNA AB, Huskvarna (SE)

( * ) Notice: Subject to any disclaimer, the term of this patent is extended or adjusted under 35 U.S.C. 154(b) by 1144 days.

(21) Appl. No.: 17/044,857

(22) PCT Filed: Apr. 3, 2019

(86) PCT No.: PCT/SE2019/050306
§ 371 (c)(1),
(2) Date: Oct. 1, 2020

(87) PCT Pub. No.: WO2019/194732
PCT Pub. Date: Oct. 10, 2019

(65) Prior Publication Data
US 2021/0131533 A1    May 6, 2021

(30) Foreign Application Priority Data

Apr. 4, 2018  (SE) .................................. 1850375-5

(51) Int. Cl.
*F16H 7/12*  (2006.01)
*B24B 7/18*  (2006.01)
(Continued)

(52) U.S. Cl.
CPC ........... *F16H 7/1281* (2013.01); *B24B 7/186* (2013.01); *B24B 41/047* (2013.01);
(Continued)

(58) Field of Classification Search
CPC ........... F16H 7/1281; F16H 2007/0808; F16H 2007/0865; F16H 2007/0893; B24B 7/186;
(Continued)

(56) References Cited

U.S. PATENT DOCUMENTS 1,641,799 A   9/1927  Brandes et al.
1,660,520 A   2/1928  Nielsen et al.
(Continued)

FOREIGN PATENT DOCUMENTS

AU   437509 B2   7/1973
AU   501254 B2   6/1979
(Continued)

OTHER PUBLICATIONS

International Preliminary Report on Patentability for International Application No. PCT/SE2019/050306 mailed on Oct. 6, 2020.
(Continued)

*Primary Examiner* — Joel D Crandall
*Assistant Examiner* — Caleb Andrew Holizna
(74) *Attorney, Agent, or Firm* — Burr & Forman LLP

(57) ABSTRACT

A transmission arrangement (113) comprising a first axle (24) that is rotatable about a first axis (33) and is connected to a first pulley (25) that is arranged to drive an endless power transferring means (26) that further is adapted to drive a second pulley (27) that is rotatable about a second axis (34), where the transmission arrangement (113) comprises a first idle pulley (101) and a second idle pulley (102) which both are adapted to guide the endless power transferring means (26), where the first idle pulley (101) is rotatable around a first idle pulley axis (103) and the second idle pulley (102) is rotatable around a second idle pulley axis (104), where the distance between the idle pulley axes (103, 104) is fixed and where the idle pulley axes (103, 104) are
(Continued)

pivotable around a common pivot axis (105), wherein the first pulley (25) is positioned between the idle pulleys (101, 102) and the second pulley (27) such that a distance between any one of the idle pulley axes (103, 104) and the second axis (34) exceeds a distance between any one of the idle pulley axes (103,104) and the first axis (33).

20 Claims, 13 Drawing Sheets

(51) Int. Cl.
B24B 41/047 (2006.01)
F16H 7/08 (2006.01)

(52) U.S. Cl.
CPC ........... F16H 2007/0808 (2013.01); F16H 2007/0865 (2013.01); F16H 2007/0893 (2013.01)

(58) Field of Classification Search
CPC .... B24B 7/10; B24B 7/12; B24B 7/18; B24B 41/047; B24B 41/002
USPC .......................................... 451/353
See application file for complete search history.

(56) References Cited

U.S. PATENT DOCUMENTS

| | | | |
|---|---|---|---|
| 2,541,812 | A | 2/1951 | Finnell |
| 2,662,454 | A | 12/1953 | Edwin |
| 2,674,896 | A | 4/1954 | Arones |
| 2,710,416 | A | 6/1955 | Lalonde |
| 2,765,483 | A | 10/1956 | Le Blanc |
| 3,121,982 | A | 2/1964 | Miller |
| 3,800,612 | A | 4/1974 | Fulghum |
| 3,934,377 | A | 1/1976 | Tertinek |
| 4,416,647 | A | 11/1983 | White, Jr. |
| 4,564,098 | A | 1/1986 | Hormann |
| 5,221,236 | A | 6/1993 | Raymer et al. |
| 5,608,939 | A | 3/1997 | Waldhauser et al. |
| 5,776,025 | A | 7/1998 | Labudde et al. |
| 5,849,097 | A | 12/1998 | Windmeisser |
| 5,885,139 | A | 3/1999 | Lemieux et al. |
| 6,176,071 | B1 | 1/2001 | Thorman et al. |
| 2002/0039943 | A1 | 4/2002 | Serkh |
| 2006/0026781 | A1 | 2/2006 | Van Vliet |
| 2007/0042846 | A1 | 2/2007 | Van Vliet |
| 2008/0176498 | A1 | 7/2008 | Rossi et al. |
| 2009/0074511 | A1 | 3/2009 | Anderson |
| 2011/0070986 | A1 | 3/2011 | Maguire et al. |
| 2011/0136418 | A1* | 6/2011 | Weder ............... B24B 47/12 451/353 |
| 2013/0084782 | A1 | 4/2013 | McCutchen et al. |
| 2013/0111700 | A1* | 5/2013 | Waitz .............. B60B 33/0057 16/44 |
| 2017/0304914 | A1* | 10/2017 | Sandwall ............ B23D 47/12 |

FOREIGN PATENT DOCUMENTS

| | | | |
|---|---|---|---|
| CN | 101678535 | A | 3/2010 |
| CN | 101868652 | A | 10/2010 |
| CN | 101934505 | A | 1/2011 |
| CN | 102267106 | A | 12/2011 |
| CN | 202640058 | U | 1/2013 |
| CN | 105626798 | A | 6/2016 |
| CN | 106163738 | A | 11/2016 |
| CN | 106907439 | A | 6/2017 |
| DE | 102012201211 | A1 | 8/2013 |
| EP | 0122181 | A1 * | 10/1984 |
| EP | 1236931 | A2 | 9/2002 |
| EP | 2337653 | B1 | 1/2016 |
| EP | 2992998 | A1 | 3/2016 |
| GB | 746802 | A | 3/1956 |
| GB | 766034 | A | 1/1957 |
| GB | 918162 | A | 2/1963 |
| GB | 944549 | A | 12/1963 |
| JP | S5485552 | U | 6/1979 |
| JP | H10184827 | A | 7/1998 |
| KR | 100931641 | B1 | 12/2009 |
| KR | 20150099898 | A | 9/2015 |
| SE | 446552 | B | 9/1986 |
| WO | 2005012765 | A1 | 2/2005 |
| WO | 2014055031 | A1 | 4/2014 |
| WO | 2015180828 | A1 | 12/2015 |
| WO | 2017207722 | A1 | 12/2017 |

OTHER PUBLICATIONS

International Search Report and Written Opinion for International Application No. PCT/SE2019/050306 mailed Jul. 23, 2019.
Swedish Office Action and Search Report for Swedish Application No. 1850375-5, Mailed on Sep. 28, 2018.
Swedish Office Action and Search Report for Swedish Application No. 1850376-3, Mailed on Sep. 28, 2018.
Swedish Office Action and Search Report for Swedish Application No. 1850377-1, Mailed on Sep. 28, 2018.
Swedish Office Action and Search Report for Swedish Application No. 1950409-1, Mailed on Jul. 24, 2019.

* cited by examiner

SECTION A-A

SECTION B-B

SECTION B-B

SECTION B-B

SECTION A-A

SECTION B-B

SECTION B-B

TRANSMISSION ARRANGEMENT FOR A FLOOR SURFACING MACHINE COMPRISING A FIRST AND SECOND IDLE PULLEY, BOTH PIVOTABLE AROUND A COMMON PIVOT AXIS

TECHNICAL FIELD

The present disclosure relates to a floor surfacing machine comprising a frame carried by at least two wheels, further comprising a motor and a tool holder disc adapted to be driven by the motor.

BACKGROUND

A floor surfacing machine such as a floor grinding machine is commonly used to strip or smooth flooring by grinding undesired material. A clean, smooth and essentially flat surface to which new coverings or coatings can be applied may be provided.

Floor surfacing machines are also commonly used to smooth a rough flooring surface or remove surface levelling compounds to create a floor which has a smooth, level surface. Certain surfaces, including some types of concrete, are also suitable for polishing using a floor surfacing machine.

One common type of floor surfacing machine is the planetary-type machine. This type of machine normally comprises two to four, or even more, satellite grinding heads in the form of a tool holder discs mounted within a larger planetary head, where the satellite grinding heads may be driven in one direction and the planetary head in another direction. Either one motor drives both the satellite grinding heads and the planetary head, or alternatively two separate motors are used for driving both satellite grinding heads and the planetary head, where transmission for example can be accomplished by means of transmission belts and belt pulleys.

One other common type of floor surfacing machine has a single grinding head in the form of a tool holder disc. When a combustion engine or electric motor is used for propelling the single grinding head, the rotational speed of the engine needs to be lowered by means of a transmission arrangement which comprises a transmission belt and two belt pulleys of different dimensions; one belt pulley is connected to an engine axis and another belt pulley is connected to a grinding head axis that in turn is connected to the single grinding head, for example as shown in U.S. Pat. No. 3,934,377.

A design according to U.S. Pat. No. 3,934,377 requires that the grinding disc is levelled with the floor by adjusting the height of a wheel axle after every tool change. Otherwise the wear of the tools will be uneven and the grinding result will not be good.

It is therefore desired to provide an improved floor surfacing machine, with a motor-driven single grinding head, where an improved symmetry with respect to the single grinding head is achieved, as well as with an alleviated requirements for adjustments when changing tool.

It is also desired to provide an improved transmission arrangement that enables an easier belt change and with an improved general serviceability compared to prior such transmission arrangements. It is also desired to provide an improved transmission arrangement where the transmission axles rotate at a suitable speed.

Furthermore, irrespective of the type of floor surfacing machine that is used, a grinding head is constituted of a tool holder disc with a number of detachably mounted carrier plates each holding abrading elements. By having detachably mounted carrier plates, the abrasive elements can be easily exchanged reducing the total costs and increasing the flexibility in relation to having carrier plates with fixed abrading elements. Different floors may have different properties, for instance hardness, porosity, material composition. This may affect the optimal setup of abrading elements, and even if an operator uses a tool holder disc with detachably mounted carrier plates, the operator sometimes have to find a good enough compromise.

EP 2337653 describes fixing grooves having a conical shape tapering radially outwards from the center of the disc. The grooves are evenly distributed around the circumference of the disc and are adapted to receive carrier plates with corresponding abrasive elements. The grooves have inclined radially propagating inner walls which are adapted to co-operate with corresponding sides of the carrier plates such that the carrier plates are kept in the corresponding grooves and urged towards the tapered groove end during operation.

It is desired to obtain an improved arrangement for attaching the detachably mounted carrier plates, where the carrier plates are more securely maintained in position without degrading the detachability.

Furthermore, if a driving pulley inflicts jerks in a drive belt or any other type of endless power transferring means, these jerks put strain on the drive belt. Such jerks can be inflicted by means of the driving pulley if the driving pulley in turn is propelled by means of a combustion engine, in particular a single cylinder combustion engine. It is desired that the effect of such jerks is reduced, which prolongs the life of the drive belt.

SUMMARY

It is an object of the present disclosure to provide a floor surfacing machine where the effect of jerks, inflicted to a drive belt or any other type of endless power transferring means by means of a driving pulley, is alleviated.

This object is obtained by means of a transmission arrangement comprising a first axle that is rotatable about a first axis and is connected to a first pulley that is arranged to drive an endless power transferring means that further is adapted to drive a second pulley that is rotatable about a second axis. The transmission arrangement comprises a first idle pulley and a second idle pulley which both are adapted to guide the endless power transferring means. The first idle pulley is rotatable around a first idle pulley axis and the second idle pulley is rotatable around a second idle pulley axis. The distance between the idle pulley axes is fixed and the idle pulley axes are pivotable around a common pivot axis. The first pulley is positioned between the idle pulleys and the second pulley such that a distance between any one of the idle pulley axes and the second axis exceeds a distance between any one of the idle pulley axes and the first axis.

This means that if a driving pulley, such as for example the first pulley, inflicts jerks in the endless power transferring means, these jerks are absorbed by means of the idle pulleys as they pivot around a common pivot axis. Such jerks can be inflicted by means of the driving pulley if the driving pulley in turn is propelled by means of a combustion engine, in particular a single cylinder combustion engine. By means of the idle pulleys, the effect of such jerks reduced, which prolongs the life of the endless power transferring means.

According to some aspects, the first pulley is positioned between the common pivot axis and the second pulley, such that a distance between the pivot axis and the second axis exceeds a distance between the common pivot axis and the first axis.

According to some aspects, the second axis, the first axis and the pivot axis are adapted to run in a common plane.

This provides an increased stability.

According to some aspects, the common pivot axis runs through a pivot axle that is positioned between the idle pulleys.

This also provides an increased stability.

According to some aspects, the pivot axle comprises an elastomeric insert that provides an elastic fastening of the pivot axle relative the first axis and the second axis.

This means that the pivot axle and the idle pulleys can move in relation to the inner axle as well as the first axis and the second axis by means of the elastomeric insert being resiliently deformed, enabling further absorption of jerks.

According to some aspects, each idle pulley is connected to a corresponding pulley axle through which the corresponding pulley axis runs, where the pulley axles are attached to holding means that is pivotable around the common pivot axis.

In this manner, the idle pulley are maintained in a fixed manner relative each other.

According to some aspects, the holding means comprises a tongue part that is movable between a first resilient part and a second resilient part, where the holding means preferably is in the form of a plate.

According to some aspects, the holding means comprises a tongue part that is held between and in contact with a first resilient part and a second resilient part, where the holding means preferably is in the form of a plate.

The jerks mentioned above are absorbed by means of the idle pulleys as they pivot around a common pivot axis and the tongue moves more or less in engagement with the resilient parts.

According to some aspects, the first pulley and the second pulley are in contact with opposite sides of the endless power transferring means.

This means that a double-sided Poly V-type belt can be used, for example a DPK dimension, which in turn means that the belt is worn on two sides, i.e. the double area, which leads to a longer belt life.

This object is also obtained by means of a transmission arrangement comprising a first axle that is rotatable about a first axis and is connected to a first pulley that is arranged to drive an endless power transferring means that further is adapted to drive a second pulley that is rotatable about a second axis. The transmission arrangement comprises a first idle pulley and a second idle pulley which both are adapted to guide the endless power transferring means. The first idle pulley is rotatable around a first idle pulley axis and the second idle pulley is rotatable around a second idle pulley axis. The distance between the idle pulley axes is fixed, and the idle pulley axes are pivotable around the first axis.

This means that if a driving pulley, such as for example the first pulley, inflicts jerks in the endless power transferring means, these jerks are absorbed by means of the idle pulleys as they pivot around a common pivot axis. Such jerks can be inflicted by means of the driving pulley if the driving pulley in turn is propelled by means of a combustion engine, in particular a single cylinder combustion engine. By means of the idle pulleys, the effect of such jerks reduced, which prolongs the life of the endless power transferring means.

According to some aspects, the idle pulleys are positioned between the first pulley and the second pulley, such that a distance between any one of the first axis and the second axis, and any one of the idle pulley axes, falls below a distance between the first axis and the second axis.

According to some aspects, the first pulley and the second pulley are in contact with one side of the endless power transferring means. The idle pulleys are in contact with an opposite side of the endless power transferring means.

According to some aspects, for both the transmission arrangements described above, there are further pulleys and a second power transferring means. This means that, according to some aspects, for both the transmission arrangements described above, the second pulley is connected to a third pulley that is arranged to drive a second endless power transferring means that further is adapted to drive a fourth pulley that is connected to a second pulley axle that is rotatable about a third axis. The first axis, the second axis and the third axis are all adapted to run mutually parallel such that there is a shortest first distance between the first axis and the third axis, such that there is a shortest second distance between the second axis and the third axis, and such that there is a shortest third distance between the first axis and the second axis. The first distance falls below the third distance.

According to some aspects, the first distance falls below the second distance.

According to some aspects, the first distance equals zero, such that the first axis and the third axis coincide.

According to some aspects, the second distance falls below the third distance.

According to some aspects, the first axis, the second axis and the third axis are adapted to run in a common plane.

This provides an increased stability.

It is an object of the present disclosure to provide a floor surfacing machine where an improved arrangement for attaching detachably mounted carrier plates is provided. Preferably, the carrier plates are more securely maintained in position without degrading the detachability.

Said object is obtained by means of a floor surfacing machine comprising a frame that is carried by at least two wheels, where the floor surfacing machine further comprises a motor and a tool holder disc. The tool holder disc is adapted to be driven by the motor and has a rotational center, a bottom side that is adapted to face a ground surface and a plurality of grooves that extend radially from said rotational center. Each groove has a conical shape tapering radially outwards from said rotational center and inclined inner walls propagating away from said rotational center. Each groove is adapted to receive a corresponding detachably mountable gripping member comprised in a carrier plate carrying abrasive elements. Each gripping member has a conical shape tapering radially outwards from said rotational center when mounted and two side walls which have an inclination that is arranged to correspond to the inclination of the inclined inner walls of the grooves. The tool holder disc comprises a biasing member for at least one groove, where each biasing member is adapted to protrude into a corresponding groove and prevent a corresponding gripping member from sliding out of the groove when mounted.

Each biasing member is constituted by a spring plate that comprises a pressure member that is adapted to act on at least an edge of an inner side of the gripping member when mounted. The inner side is facing the rotational center of the tool holder disc when mounted, where the pressure member either always will contact the inner side of the gripping member when mounted, or only when the gripping member is moved from a working position of the corresponding groove. When the pressure member is in contact with the inner side of the gripping member, it is adapted to prevent further movement of the gripping member until a spring force of the pressure member is overcome by continued movement of the gripping member, enabling the carrier plate to be released.

This confers an advantage of having carrier plates, each holding abrading elements, detachably mounted to a tool holder disc in a more secure manner than previously, without degrading the detachability. When the pressure member is in contact with the inner side of the gripping member, it is adapted to prevent further movement of the gripping member until a spring force of the pressure member is overcome by continued movement of the gripping member, enabling the carrier plate to be released.

This enables the carrier plate to be released in an uncomplicated manner, only needing the use of one hand.

According to some aspects, when a carrier plate is mounted to a groove it is radially pulled toward an outermost narrower portion of the chosen groove under the load of a pressure member of the spring plate towards an upper side of the gripping member. When sufficiently pulled toward the outermost narrower portion of the chosen groove, the pressure member is adapted to leave the upper side of the gripping member and act on an inner side of the gripping member.

This confers an advantage of providing an easily managed mounting of a carrier plate.

According to some aspects, each spring plate comprises two side parts that extend out from a corresponding groove and are attached to the tool holder disc with appropriate attachment elements.

This confers an advantage of providing a secure attachment of each spring plate.

It is also an object of the present disclosure to provide a floor surfacing machine where an improved symmetry with respect to the single grinding head is achieved, as well as with an alleviated requirements for adjustments when changing tool.

Said object is obtained by means of a floor surfacing machine comprising a frame that is carried by at least two wheels, where the floor surfacing machine further comprises a motor and a tool holder disc adapted to be driven by the motor. The motor comprises a motor axle that is rotatable about a first axis and is connected to a first pulley that is arranged to drive a first endless power transferring means that further is adapted to drive a second pulley that is connected to a first pulley axle that is rotatable about a second axis. The first pulley axle is further connected to a third pulley that is mounted closer to the tool holder disc than the second pulley, and that is arranged to drive a second endless power transferring means that further is adapted to drive a fourth pulley that is connected to a second pulley axle that is rotatable about a third axis, and the second pulley axle is adapted to propel the tool holder disc. The first axis, the second axis and the third axis are all adapted to run mutually parallel such that there is a shortest first distance between the first axis and the third axis, such that there is a shortest second distance between the second axis and the third axis, and such that there is a shortest third distance between the first axis and the second axis. The first distance falls below the third distance.

On one hand, according to some aspects, the floor surfacing machine comprises an engine mounting bracket to which the motor is mounted, and a dust cover that is adapted to partially enclose the tool holder disc, leaving at least the bottom side uncovered such that it is enabled to contact the ground surface. A compact transmission arrangement, comprising said axles, said pulleys and said endless power transferring means, is positioned between the engine mounting bracket and the dust cover such that an integrated front part is formed and connected to the frame in a pivoting manner.

In this manner, the frame, which is carried by at least two wheels, is connected to the integrated front part in a pivoting manner. The integrated front part is formed from:
  an engine mounting bracket to which the motor is mounted;
  a dust cover that is adapted to partially enclose the tool holder disc, leaving at least the bottom side uncovered such that it is enabled to contact the ground surface;
  a compact transmission arrangement comprising said axles, said pulleys and said endless power transferring means, which is positioned between the engine mounting bracket and the dust cover.

By means of this arrangement, the center of gravity of the compact integrated front part can be placed in, or at least relatively close to, a pivoting axis connecting the dust cover to the frame. The dust cover will strive to have a positon relative the frame where the tool holder disc obtains the most complete contact with the ground that is possible, dispensing with any need of wheel adjustment when changing abrasive elements and their associated carrier plates.

There will thus be no need to adjust the wheel axle height after every tool change, and the floor surfacing machine will grind smoothly across the whole tool holder disc's lower surface, from changing to new tools until completely worn tools, not requiring any user adjustments.

On the other hand, according to some aspects, alternatively, the second distance falls below the third distance, and according to some further aspects, the first endless power transferring means has a length that exceeds the length of the second endless power transferring means.

In this manner, the jerks mentioned above, and its effects, can be alleviated by means of having a relatively long endless power transferring means. The length will provide better properties regarding handling tension increase in the endless power transferring means.

According to some aspects, the first distance falls below the second distance.

This confers an advantage of providing a compact transmission arrangement where an improved symmetry with respect to the single grinding head is achieved.

According to some aspects, the first belt pulley has a first outer diameter, the second belt pulley has a second outer diameter, the third belt pulley has a third outer diameter and the fourth belt pulley has a fourth outer diameter. The second outer diameter exceeds the first outer diameter, and the fourth outer diameter exceeds the third outer diameter.

This confers an advantage of providing a preferred rotational speed for the rotating parts.

According to some aspects, the floor surfacing machine comprises a first tension pulley and a second tension pulley, where each tension pulley is adapted to inflict a releasable pressure on a corresponding endless power transferring means.

This confers an advantage of providing a separate tensioning means.

According to some aspects, at least one tension pulley is rotatably mounted to a corresponding pressure part that is at least indirectly pivotably mounted to a corresponding pressure part axle, where each pressure part is connected to a corresponding spring that is adapted to exert a spring load at the corresponding pressure part such that each tension pulley is pressed towards a corresponding endless power transferring means. At least one pressure part axle is constituted by a pulley axle, by an intermediate part connecting belt pulleys that are rotatable around a common axis, or by the motor axle.

This confers an advantage of using at least one existing axle for a corresponding pressure part to which a corresponding tension pulley is rotatably mounted, which provides a compact design with less parts.

According to some aspects, the first tension pulley is rotatably mounted to a first pressure part that is pivotably mounted to the motor axle, where the first pressure part is connected to a first spring that is adapted to exert a spring load at the first pressure part such that the first tension pulley is pressed towards the first endless power transferring means. The second tension pulley is rotatably mounted to a second pressure part that is pivotably mounted to the second pulley axle, where the second pressure part is connected to a second spring that is adapted to exert a spring load at the second pressure part such that the second tension pulley is pressed towards the second endless power transferring means.

This confers an advantage of using each one of two existing axles for a corresponding pressure part to which a corresponding tension pulley is rotatably mounted, which provides a compact design with less parts.

According to some aspects, each spring is connected to a corresponding releasable handle, where each releasable handle is releasably attachable to a corresponding bracket.

This confers an advantage of making the tensioning and release of the tensioning easier.

According to some aspects, the dust cover comprises a first mounting flange and a second mounting flange, which mounting flanges extend towards the engine mounting bracket and are connected to the frame in a pivoting manner by means of connecting pins.

This confers an advantage of providing a reliable an uncomplicated pivoting functionality.

According to some aspects, the transmission arrangement comprises a plurality of subassemblies that can be removed from the floor surfacing machine individually.

This confers an advantage of enabling easy the maintenance of the transmission arrangement, such that there is no need to demount the engine or the frame if for example a pulley or a bearing needs to be replaced.

According to some aspects, the endless power transferring means are in the form of endless belts which according to some further aspects are of a Poly V-type and have a PK or DPK dimension.

This confers an advantage of using well-known and reliable endless belt dimension, suited for the present purpose. In the case of a DPK dimension being enabled, for example by means of a transmission arrangement with idle pulleys as mentioned below, the belt is worn on two sides, i.e. the double area, which leads to a longer belt life.

According to some aspects, the floor surfacing machine comprises a transmission arrangement with idle pulleys as described above that are adapted to be used for either the first endless power transferring means or the second endless power transferring means. Idle pulleys can alternatively be used for both endless power transferring means. This of course leads the advantages discussed above in association with the transmission arrangements with idle pulleys.

It is also an object of the present disclosure to provide a floor surfacing machine having a compact design with less parts.

Said object is obtained by means of a floor surfacing machine comprising a frame that is carried by at least two wheels, where the floor surfacing machine further comprises a motor and a tool holder disc adapted to be driven by the motor via two endless power transferring means that connect respective opposing pulleys that are attached to corresponding pulley axles. The floor surfacing machine comprises a first tension pulley and a second tension pulley, where each tension pulley is adapted to inflict a releasable pressure on a corresponding endless power transferring means.

At least one tension pulley is rotatably mounted to a corresponding pressure part that at least indirectly is pivotably mounted to a corresponding pressure part axle. Each pressure part is connected to a corresponding spring that is adapted to exert a spring load at the corresponding pressure part such that each tension pulley is pressed towards a corresponding endless power transferring means. At least one pressure part axle is constituted by a pulley axle, by an intermediate part connecting belt pulleys that are rotatable around a common axis, or by the motor axle.

This confers an advantage of using at least one existing axle for a corresponding pressure part to which a corresponding tension pulley is rotatably mounted, which provides a compact design with less parts.

According to some aspects, the motor comprises a motor axle that is rotatable about a first axis and is connected to a first pulley that is arranged to drive a first endless power transferring means that further is adapted to drive a second pulley that is connected to a first pulley axle that is rotatable about a second axis. The first pulley axle is further connected to a third pulley that is mounted closer to the tool holder disc than the second pulley, and that is arranged to drive a second endless power transferring means that further is adapted to drive a fourth pulley that is connected to a second pulley axle that is rotatable about a third axis. The second pulley axle is adapted to propel the tool holder disc.

This confers an advantage of providing a compact transmission arrangement where an improved symmetry with respect to the single grinding head is achieved.

According to some aspects, the first tension pulley is rotatably mounted to a first pressure part that is pivotably mounted to the motor axle, where the first pressure part is connected to a first spring that is adapted to exert a spring load at the first pressure part such that the first tension pulley is pressed towards the first endless power transferring means. The second tension pulley is rotatably mounted to a second pressure part that is pivotably mounted to the second pulley axle. The second pressure part is connected to a second spring that is adapted to exert a spring load at the second pressure part such that the second tension pulley is pressed towards the second endless power transferring means.

This confers an advantage of using each one of two existing axles for a corresponding pressure part to which a corresponding tension pulley is rotatably mounted, which provides a compact design with less parts.

According to some aspects, each spring is connected to a corresponding releasable handle, where each releasable handle is releasably attachable to a corresponding bracket.

This confers an advantage of making the tensioning and release of the tensioning easier.

BRIEF DESCRIPTION OF THE DRAWINGS

The present disclosure will now be described more in detail with reference to the appended drawings, where.

DETAILED DESCRIPTION

Figure 1:
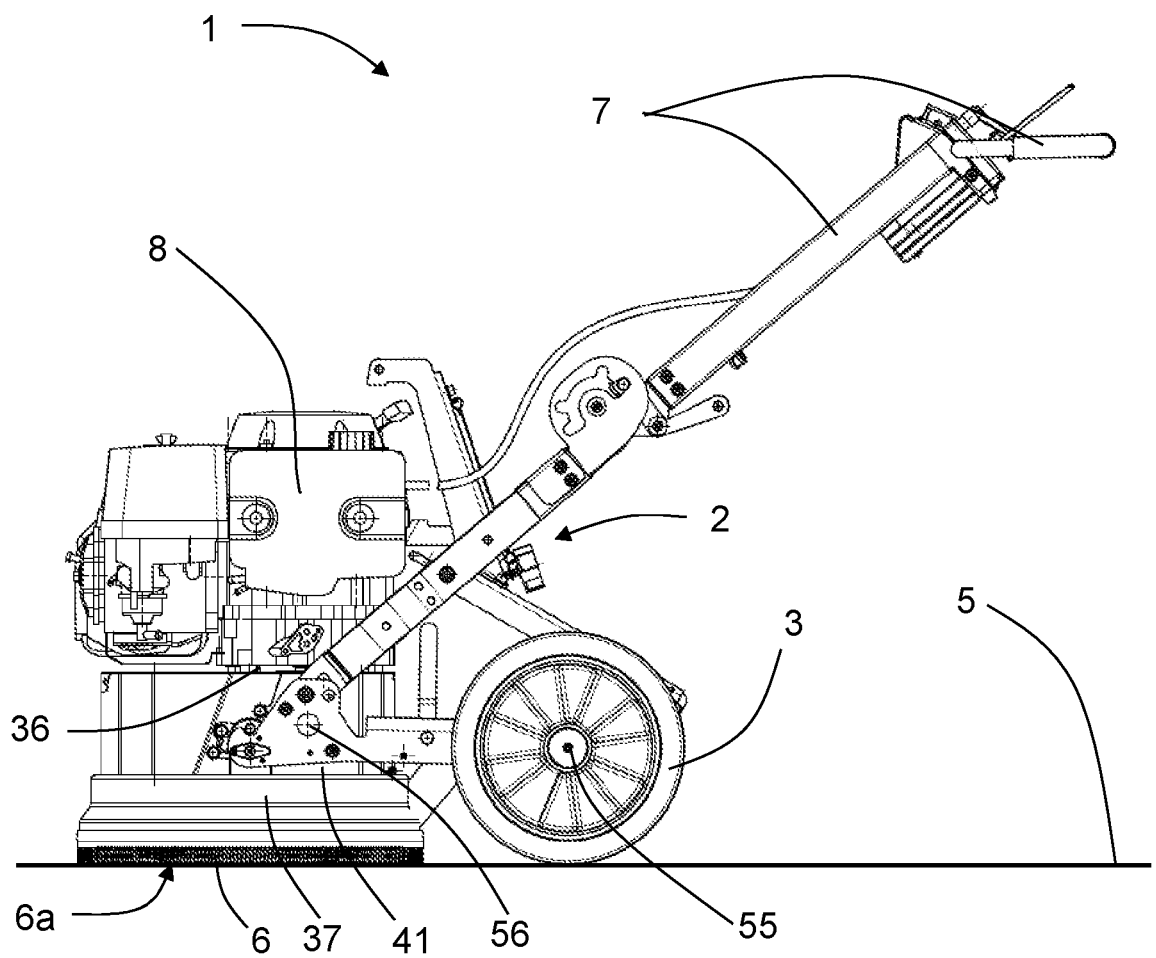
FIG. 1 shows a side view of a floor surfacing machine.
Figure 2:
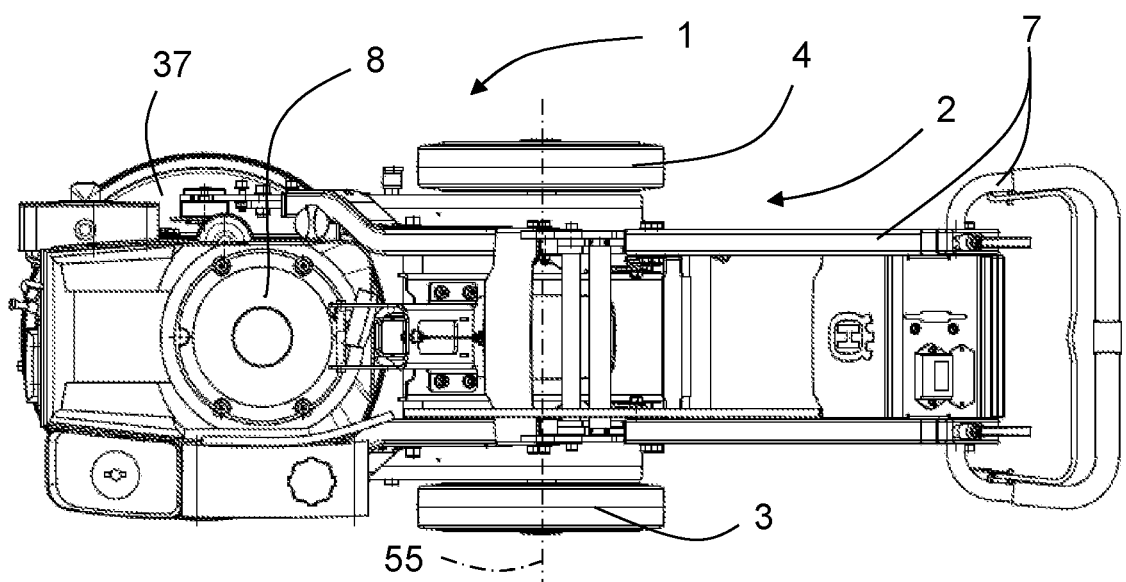
FIG. 2 shows a top view of a floor surfacing machine.

FIG. 1 and FIG. 2 show a side and a top view of a floor surfacing machine 1, for example a floor grinding or polishing machine. The floor surfacing machine 1 has a frame 2 that is carried by a first wheel 3 and a second wheel 4. The frame 2 comprises a handle arrangement 7 allowing an operator to move the machine over a ground surface 5 to be surfaced. The surfacing machine comprises a combustion engine 8 that is mounted to an engine mounting bracket 36 and is adapted to propel, a grinding head that is constituted of a tool holder disc 6 having a bottom side 6a that is adapted to face the ground surface 5 during the grinding process. The tool holder disc 6 is partially enclosed by a dust cover 37, leaving at least the bottom side 6a uncovered such that it is enabled to contact the ground surface 5 during the grinding process.

Figure 3:
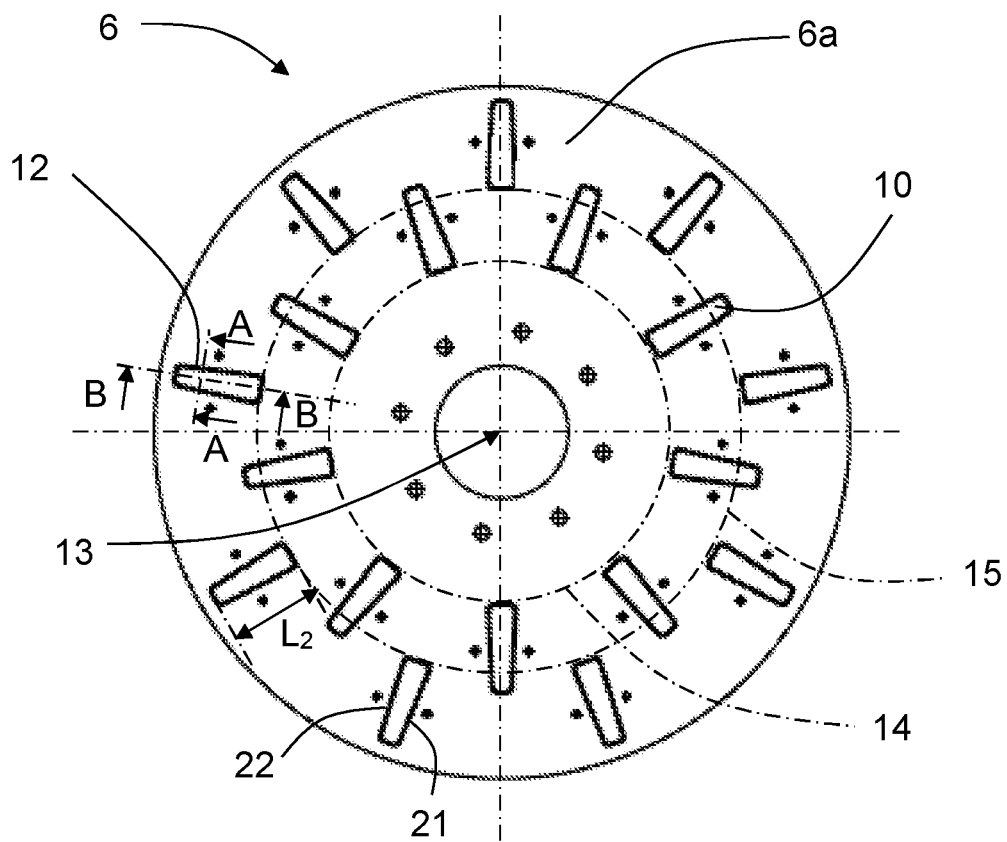
FIG. 3 shows a bottom view of a tool holder disc.

With reference also to FIG. 3, the tool holder disc 6 has a first set of fixing means in the form of radially extending first grooves 10 (only one groove is indicated by reference number in the Figure for reasons of clarity) that are equidistantly distributed, both from a rotational center 13 of the tool holder disc 6, and along a first circular extension 14 running around the rotational center 13 of the tool holder disc 6. The tool holder disc 6 also has a second set of fixing means in the form of radially extending second grooves 12 (only one indicated by reference number in the Figure for reasons of clarity) that are equidistantly distributed, both from the rotational center 13 of the tool holder disc 6, and along a second circular extension 15 running around the rotational center 13 of the tool holder disc 6.

The first circular extension 14 runs such that it passes through the first grooves 10 as close to the rotational center 13 of the tool holder disc 6 as possible, and the second circular extension 15 runs such that it passes through the second grooves 12 as close to the rotational center 13 of the tool holder disc 6 as possible. The first circular extension 14 is closer to the rotational center 13 of the tool holder disc 6 than the second circular extension 15.

Figure 4:
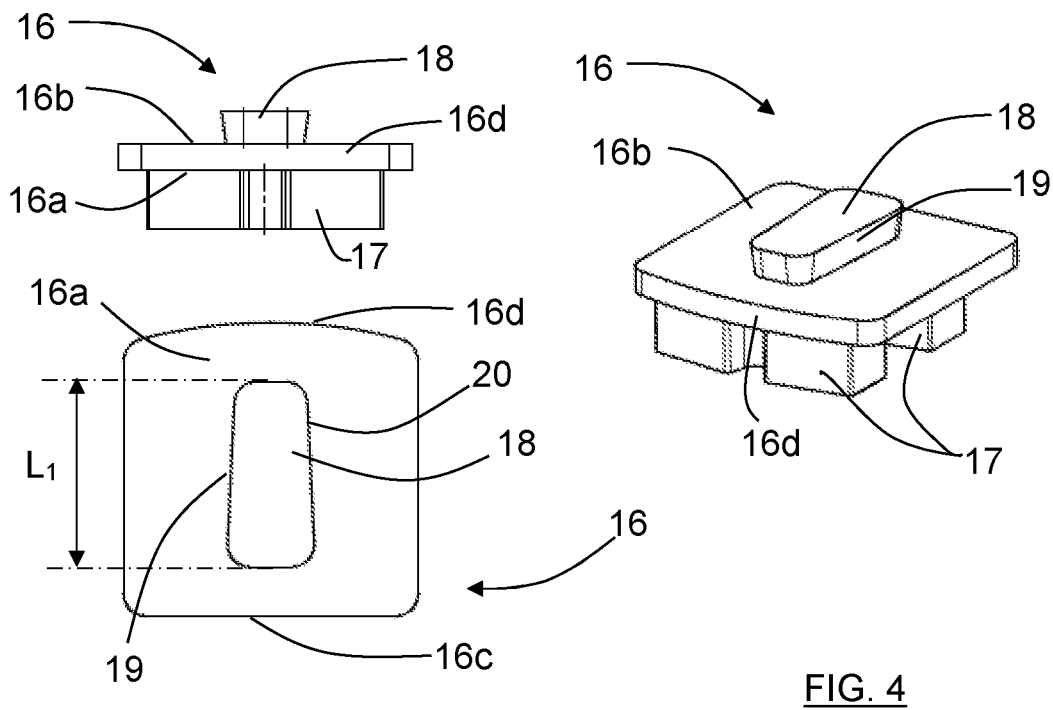
FIG. 4 shows a perspective view, a side view and a top view of a carrier plate.
Figure 5:
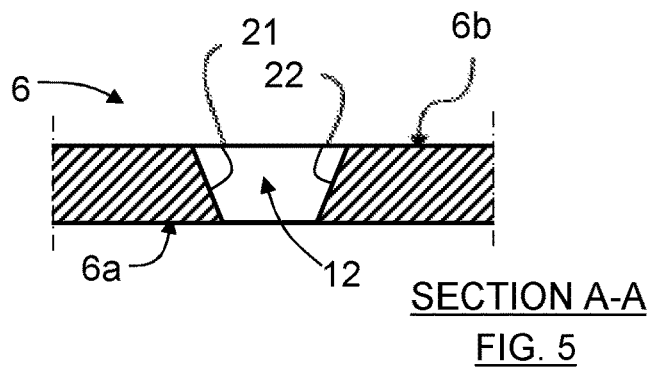
FIG. 5 shows a transverse section of a groove

With reference also to FIG. 4, showing a perspective view, a side view and a top view of a carrier plate 16, and FIG. 5, showing a transverse section of a groove 12, the grooves 10, 12 are adapted for receiving detachably mountable carrier plates 16, each comprising abrasive elements 17, at the bottom side 6a of the tool holder disc 6. For this purpose, the grooves 10, 12 are radially extending with respect to the rotational center 13 of the tool holder disc 6, and each groove 10, 12 has a conical shape tapering radially outwards from the rotational center 13 of the tool holder disc 6. Furthermore, each groove 12 has inclined inner walls 21, 22 propagating away from the rotational center 13 of the tool holder disc 6.

Each carrier plate 16 has an underside 16a and a top side 16b, on which top side 16b a radial gripping member 18 is fastened. The gripping member 18 preferably extends along a path from an innermost end 16c to a farthest out end 16d of the carrier plate 16 with respect to the rotational center 13 of the tool holder disc 6 when the carrier plate is mounted. The gripping member 18 has a conical shape with its base facing towards said innermost end 16c and the tip towards said farthest out end 16d.

Further, the gripping member 18 has two side walls 19, 20 which have an inclination outwards and upwards from the top side 16a of the carrier plate 16. Said inclination is arranged to correspond to the inclination of the inclined inner walls 21, 22 of the grooves 10, 12. The longitudinal length $L_1$ of the gripping member 18 falls below the length $L_2$ of the grooves 10, 12 in their radial extension.

Figure 6A:
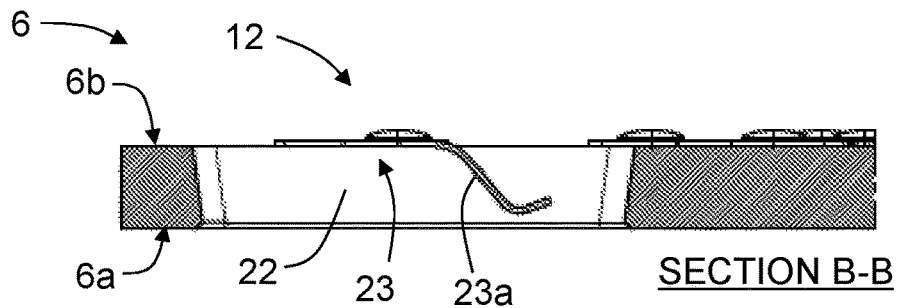
FIG. 6A shows a longitudinal section of a groove without a carrier plate.

According to the present disclosure, with reference also to FIG. 6A that show a longitudinal section of a groove 12, the tool holder disc 6 comprises a spring plate 23 for each grove 12, placed and fastened on an upper side 6b of the tool holder disc 6, which upper side 6b is adapted to face away from ground surface 5 during the grinding process and being opposite to the lower side 6a.

Figure 6B:
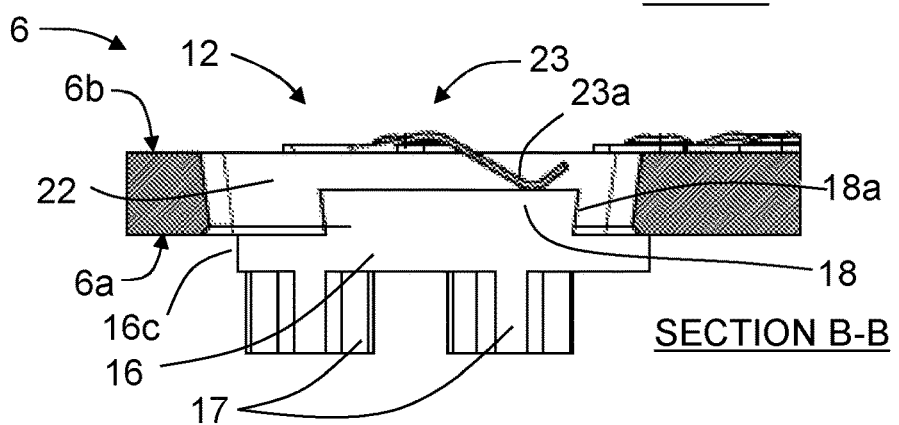
FIG. 6B shows a longitudinal section of a groove with a semi-attached carrier plate.
Figure 6C:
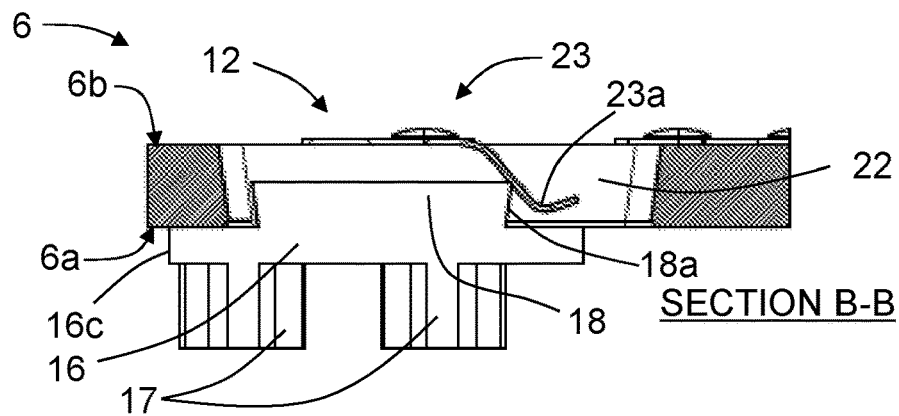
FIG. 6C shows a longitudinal section of a groove with an attached carrier plate.

When attaching a carrier plate 16 to a groove 10, 12, the tool holder disc 6 is first put down with its bottom side 6a turned upwards exposing the grooves 10, 12. One of the grooves 12 is chosen for mounting a carrier plate 16, and as shown in FIG. 6B, the gripping member 18 of the carrier plate 16 is placed into the wider part of the chosen groove 12 with the innermost end 16c of said carrier plate 16 pointing towards the rotational center 13 of the tool holder disc 2. The carrier plate 16 is subsequently radially pulled toward the outermost narrower portion of the chosen groove 10, 12, under the load of a pressure member 23a of the spring plate 23 towards an upper side 18b of the gripping member 18, fixing the carrier plate 16 by means of co-operation between the mating groove 10, 12 and the gripping member 18. With reference also to FIG. 6C, when sufficiently pulled toward the outermost narrower portion of the chosen groove 10, 12, the pressure member 23a will act on an inner side 18a of the gripping member 18, where said inner side 18a is facing the rotational center 13 of the tool holder disc 6 when mounted. Generally, each pressure member 23a is adapted to act on at least an edge of an inner side 18a of the gripping member 18 when mounted.

According to some aspects, the pressure member 23a will not be in contact with the inner side 18a of the gripping member 18 when the gripping member 18 is moved to a working position at the outermost narrower portion of the chosen groove 10, 12. The pressure member 23a will contact the inner side 18a of the gripping member 18 when the gripping member 18 is moved from the working position, preventing it from further movement.

Alternatively, the pressure member 23a will always be in contact with the inner side 18a of the gripping member 18 when mounted, even in the working position.

Both alternatives above are to be interpreted to fall within a general definition that each biasing member 23 is adapted to act on at least an edge of an inner side 18a of the gripping member 18 when mounted.

The inclined inner walls 21, 22 of the grooves 10, 12 are thus adapted to co-operate with the corresponding side walls 19, 20 of each gripping member 18 such that the carrier plates 16 are kept in the corresponding grooves 10, 12 and urged towards the tapered groove end during operation, preventing them from loosening. By means of the spring plate 23, the carrier plates 16 are prevented from moving towards the rotational center 13 of the tool holder disc 6, for example during transport between different working places.

When a carrier plate 16 is to be released, the carrier plate 16 is moved towards the rotational center 13 of the tool holder disc 6, against the spring force of the a pressure member 23a such that the pressure member 23a is returned to the upper side 18b of the gripping member 18 from the inner side 18a of the gripping member 18. The pressure member 23a is pressing towards the upper side 18b of the gripping member 18 while the gripping member 18 is pulled towards the rotational center 13 until it can be removed from the groove 12.

Figure 15:
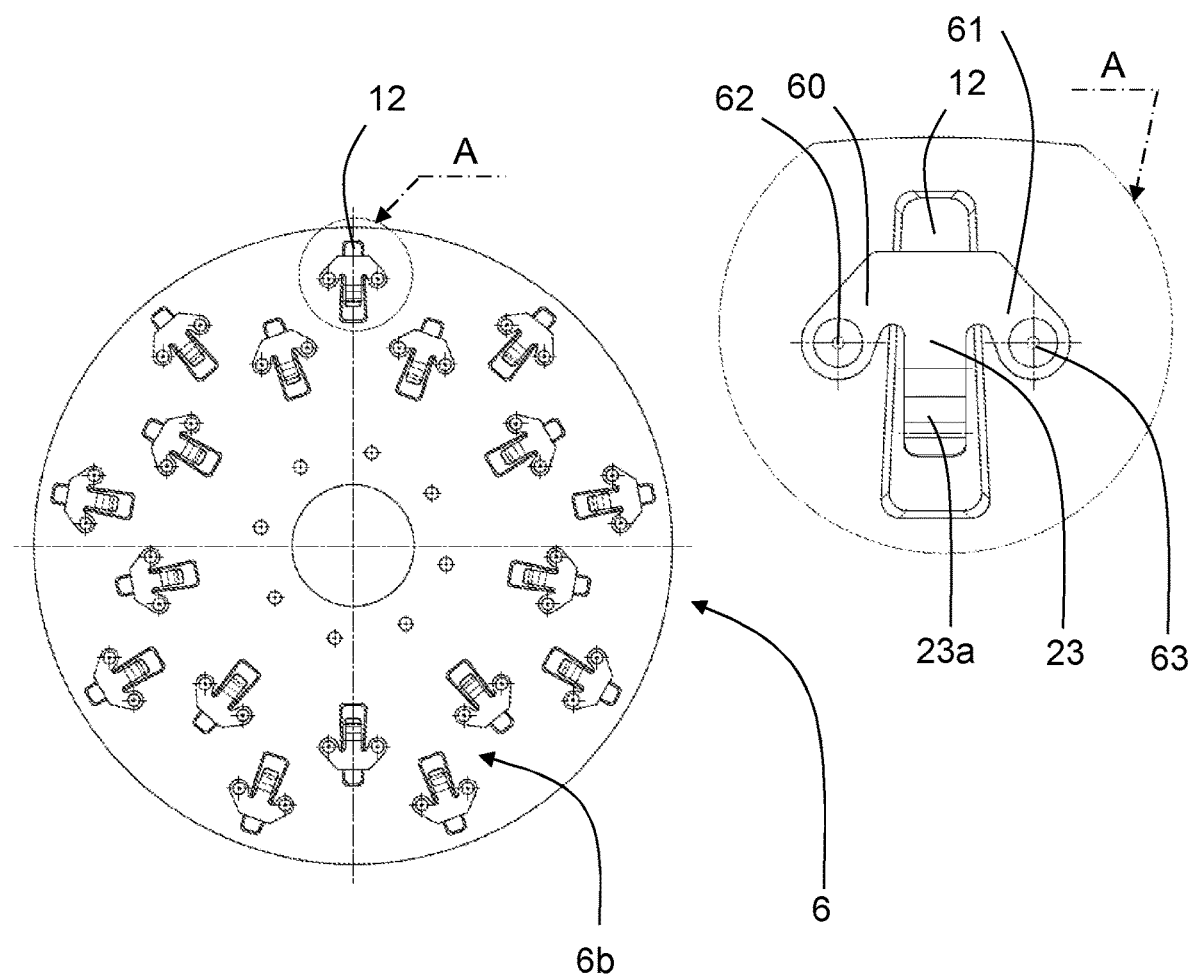
FIG. 15 shows a bottom view of an alternative tool holder disc.

In FIG. 15, it is shown how the spring plates 23 are attached to the upper side 6b of the tool holder disc 6 for one groove 12. According to some aspects, as shown here, the spring plate 23 comprises two side parts 60, 61 that extend out from the groove 12 and are attached to the tool holder disc 6 with appropriate attachment elements 62, 63 such as screws or rivets.

When the combustion engine 8 is used for propelling a single grinding head that is constituted of the tool holder disc 6, the rotational speed of the engine 8 may need to be lowered by means of a transmission arrangement. Previously, such a transmission arrangement has been in the form of a one-step belt transmission that comprises a transmission belt and two belt pulleys of different dimensions; one belt pulley is connected to an engine axis and another belt pulley is connected to a grinding head axis that in turn is connected to the single grinding head, where the engine is positioned a certain distance away from the grinding head axle. A design like this results in that the tool holder disc is pivoting around the wheel axle which in turn requires that the tool holder disc 6 is levelled with the floor by adjustment the height of a wheel axle 55 after every change of abrasive elements, otherwise the wear of the abrasive elements will be uneven and the grinding result will not be good. A more user-friendly abrasive element change is therefore desired.

It is also desired obtain an improved engine symmetry with respect to the single tool holder disc in order to increase maneuverability and ease of handling of the floor surfacing machine 1.

Figure 7:
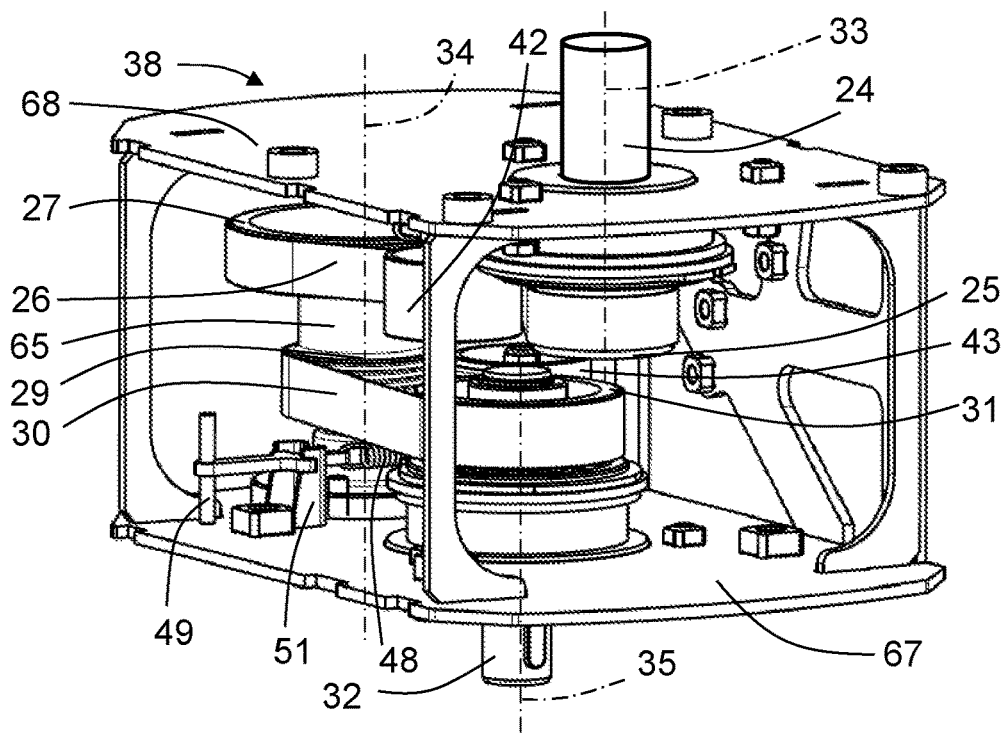
FIG. 7 shows a perspective view of a transmission arrangement.
Figure 8:
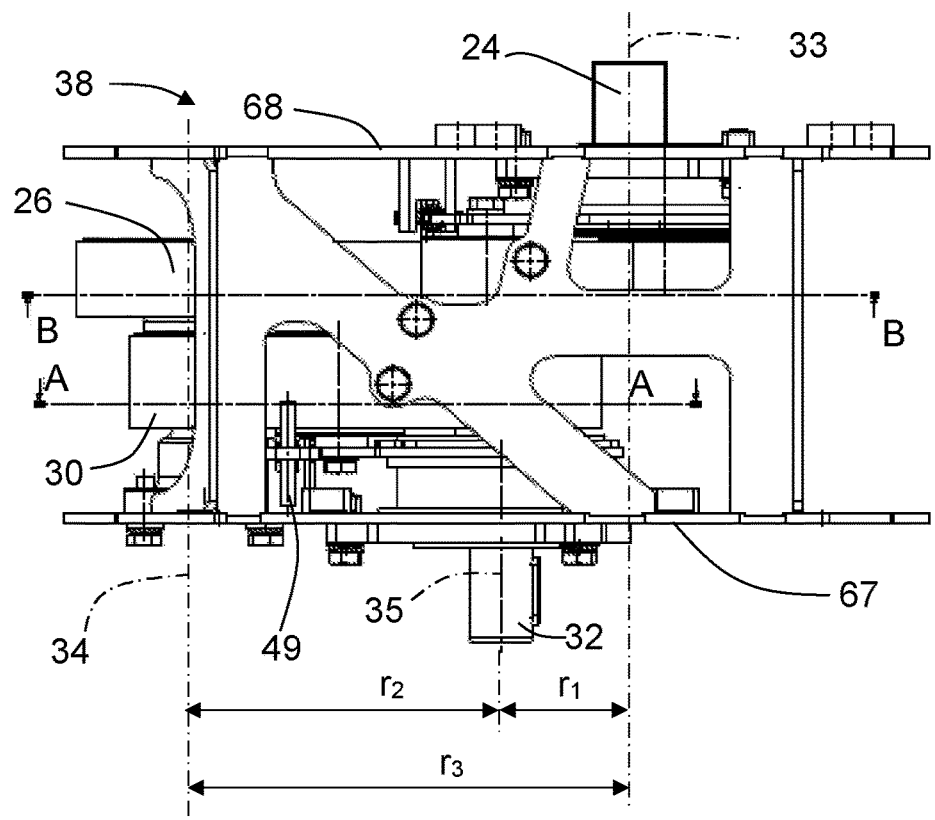
FIG. 8 shows a side view of a transmission arrangement.
Figure 10:
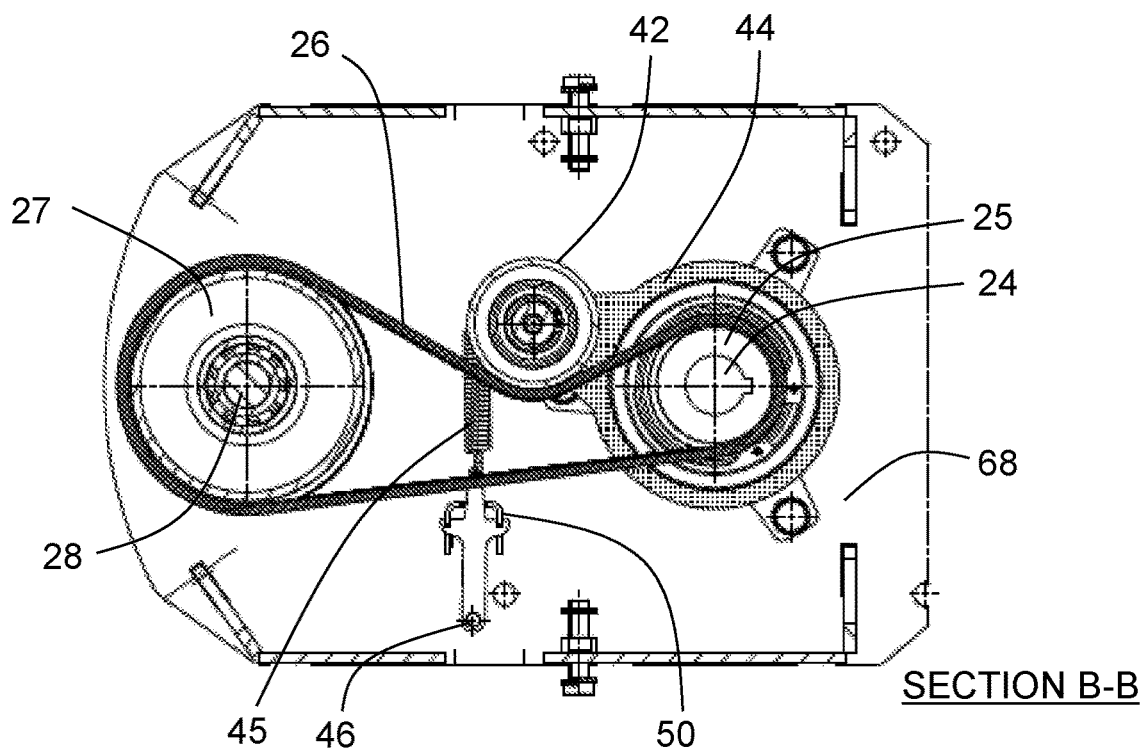
FIG. 10 shows a second section view of the transmission arrangement.
Figure 11:
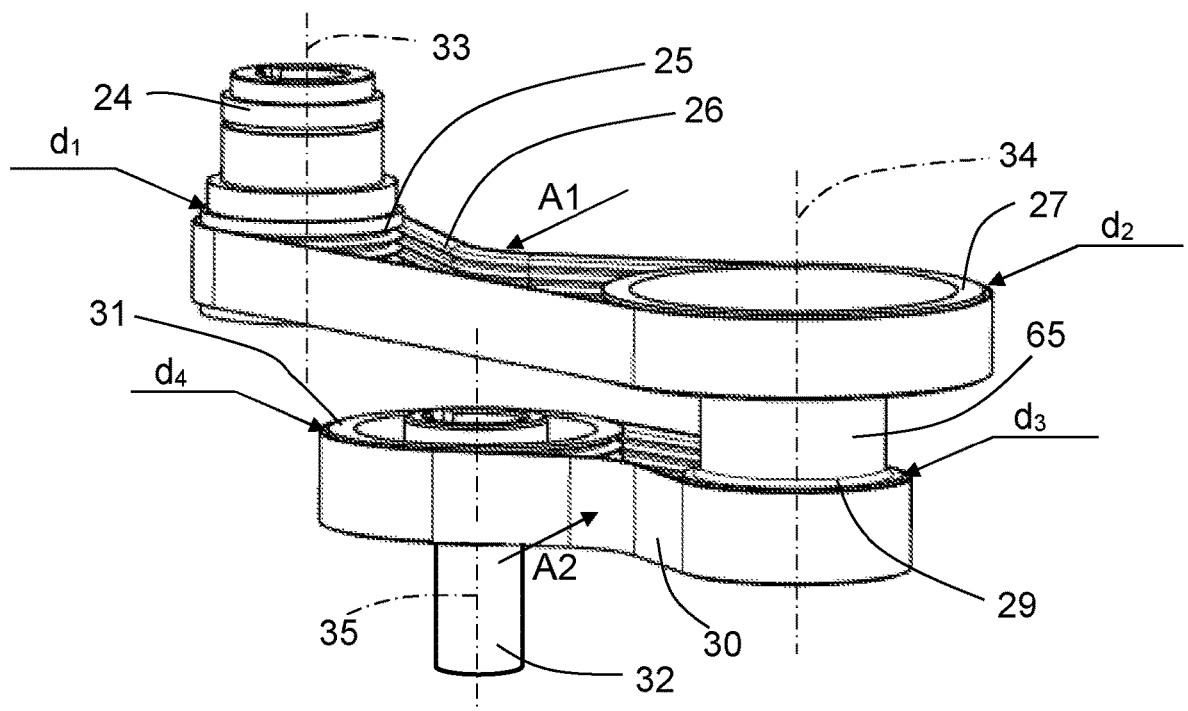
FIG. 11 shows a schematic perspective view of the transmission arrangement.

In order to overcome the above problems, in accordance with a further aspect of the present disclosure, a compact transmission arrangement 38 is provided as shown in a perspective view in FIG. 7. In FIG. 8 a side view of the transmission arrangement 38 is shown, in FIG. 9 a first section is shown and in FIG. 10 a second section is shown. FIG. 11 show a schematic perspective view of how the transmission arrangement 38 is constituted.

The engine 8 comprises an engine axle 24 that runs along, and is rotatable about, a first axis 33 and is connected to a first belt pulley 25 that is arranged to drive a first endless belt 26 that further is adapted to drive a second belt pulley 27 that is connected to an intermediate part 65 that runs along, and is rotatable about, a second axis 34. The intermediate part 65 is further connected to a third belt pulley 29 that is mounted closer to the tool holder disc 6 than the second belt pulley 27. In the intermediate part 65, a first pulley axle 28 is running, and preferably there is a bearing arrangement 66 between the first pulley axle 28 and the intermediate part 65. The first pulley axle 28 is running along the second axis 34 and is mounted to a lower housing plate 67, opposite an upper housing plate 68. The first pulley axle 28 can according to some aspects be mounted to another part, for example the upper housing plate 68.

According to some aspects, the intermediate part 65 is not needed, there may be only the first pulley axle 28 that connects the second belt pulley 27 to the third belt pulley 29.

The third belt pulley 29 is arranged to drive a second endless belt 30 that further is adapted to drive a fourth belt pulley 31 that is connected to a second pulley axle 32 that runs along, and is rotatable about, a third axis 35. The second pulley axle 32 is adapted to propel the tool holder disc 6.

The first axis 33, the second axis 34 and the third axis 35 are all adapted to run mutually parallel. There is a shortest first distance $r_1$ between the first axis 33 and the third axis 35, there is a shortest second distance $r_2$ between the second axis 34 and the third axis 35, and there is a shortest third distance $r_3$ between the first axis 33 and the second axis 34. The first distance $r_1$ falls below the third distance $r_3$.

According to some aspects, the first distance $r_1$ falls below the second distance $r_2$.

Having belt pulleys 25, 27, 29, 31 arranged in this manner such that two endless belts 26, 30 are propelled provides a gear downshift of the engine axle's rotational speed in two steps which is advantageous since a preferred rotational speed can be obtained for the rotating parts 24, 65, 32.

As shown in FIG. 11, the first belt pulley 25 has a first outer diameter $d_1$, the second belt pulley 27 has a second outer diameter $d_2$, the third belt pulley 29 has a third outer diameter $d_3$ and the fourth belt pulley 31 has a fourth outer diameter $d_4$. According to some aspects, the second outer diameter $d_2$ exceeds the first outer diameter $d_1$, and the fourth outer diameter $d_4$ exceeds the third outer diameter $d_3$.

According to some aspects the third outer diameter $d_3$ is about 1.5 times the second outer diameter $d_2$, and the second outer diameter $d_2$ is about twice the first outer diameter $d_1$. According to some aspects the third outer diameter $d_3$ is about 200 mm, the second outer diameter $d_2$ is about 130 mm and the first outer diameter $d_1$ is about 70 mm.

According to some aspects, the first distance $r_1$ equals zero, such that the first axis 33 and the third axis 35 coincide, the engine axle 24 being the same as the second pulley axle 32.

In this manner, the second pulley axle 32, that is adapted to propel the tool holder disc 6, is arranged towards the engine axle 24 relative the first pulley axle 28, and this results in that the engine 8 obtains a position closer to the tool holder disc 6 such that the engine 8 obtains an improved symmetry with respect to the tool holder disc 6.

Figure 13:
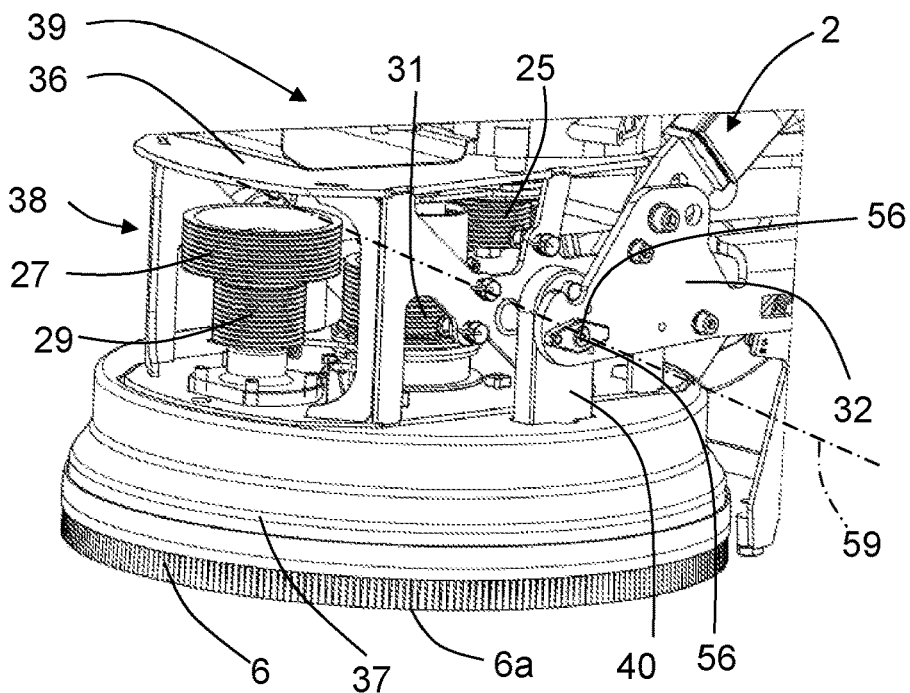
FIG. 13 shows a schematic perspective view of the transmission arrangement mounted to the floor surfacing machine.
Figure 14:
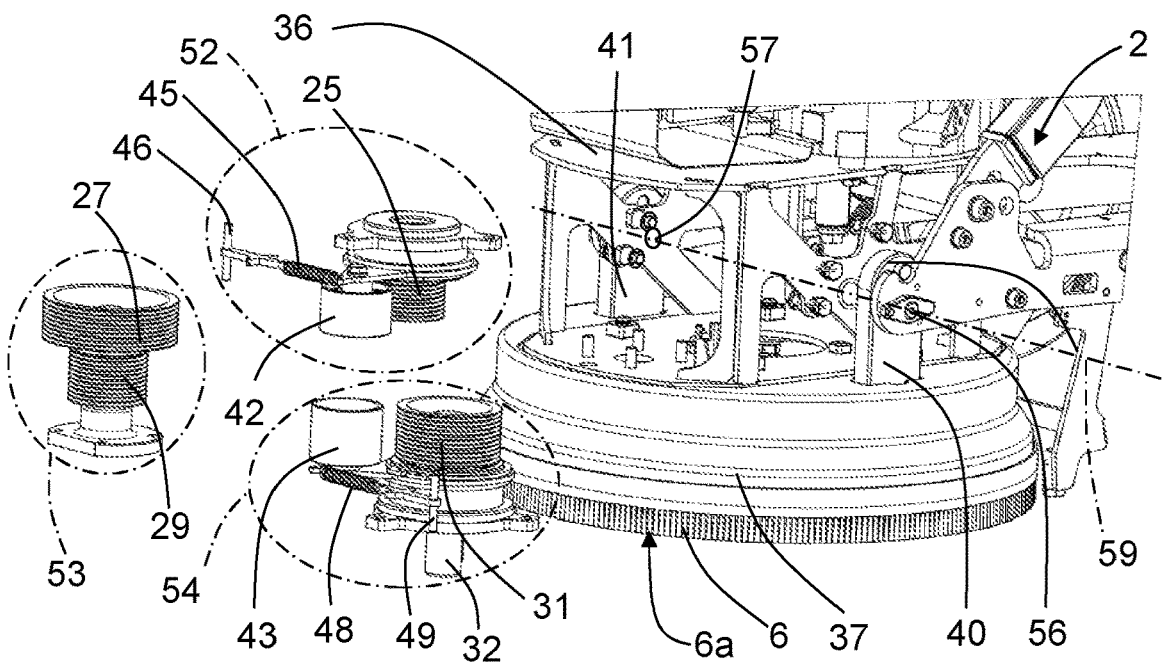
FIG. 14 shows a schematic perspective view of transmission arrangement subassemblies that have been removed from the floor surfacing machine.

The compact transmission arrangement 38 according to the present disclosure, comprising said axles 24, 28, 32, said belt pulleys 25, 27, 29, 31 and the endless belts 26, 30, is positioned between the engine mounting bracket 36 and the dust cover 37, such that a compact integrated front part 39 that is connected to the frame 2 in a pivoting manner at a pivoting axis 59 is formed as shown in FIG. 13 and FIG. 14. According to some aspects, the upper housing plate 68 and the engine mounting bracket 36 is one and the same part as indicated in FIG. 13 and FIG. 14.

As shown in FIG. 1, FIG. 2, FIG. 13 and FIG. 14, the dust cover 37 comprises a first mounting flange 40 and a second mounting flange 41, which mounting flanges 40, 41 extend towards the engine mounting bracket 36 and are connected to the frame 2 in a pivoting manner by means of connecting pins 56, 57.

By means of this arrangement, the center of gravity of the compact integrated front part 39 can be placed in, or at least relatively close to, the pivoting axis 59 connecting the dust cover 37 to the frame 2. The dust cover 37 will strive to have a positon relative the frame 2 where the tool holder disc 6 obtains the most complete contact with the ground that is possible, dispensing with any need of wheel adjustment when changing abrasive elements 17 and their associated carrier plates 16.

A balanced grinding head in the form of the tool holder disc 6 above that has the possibility to pivot provides many advantages. There will be no need to adjust the wheel axle height after every tool change. The floor surfacing machine 1 will grind smoothly across the whole tool holder disc's lower surface 6a, from changing to new tools until completely worn tools, not requiring any user adjustments.

The endless belts 26, 30 need to be tensioned to be able to transmit the torque from the engine 8 and achieve longer belt life time. The general principle of belt tensioners can be divided into two different variants, passive and active. Passive belt tensioners are mounted and fixed in one position giving the strived belt tensioning. Active belt tensioners on the other hand can, once they are installed, adapt to the elongation of the belt over time, usually by means of a spring.

Passive belt tensioners are, since they need to be checked and re-tensioned continuously as the belt lengthen, more service demanding than active belt tensioners. Small belt slack, during even short period of time, shortens the belt life dramatically. When using passive belt tensioners, it is also possible that a user tensions the endless belt more than intended, which will also shorten the life of the belts, pulleys and bearings.

Active belt tensioners often have more parts, are more expensive, and have a more complex design than the passive variant. On the other hand, they are less, if at all, service demanding. All sudden slack that appears during belt use is taken up by a spring load, maintaining proper belt tension during all time of use. A typical active belt tensioner is constituted by a tensioning pulley mounted on an arm that is pivoting around an axle placed at a suitable position next to the belt and the driving and driven pulleys.

The space available at the transmission arrangement 38 is limited, requiring a space efficient belt tensioner, where it also is desired that belt, pulley and bearing replacement can be done quickly and easily. Needing a workshop to replace an endless belt takes too much time and is too expensive for the user, instead it should be possible to do it on the floor where it broke down.

Figure 9:
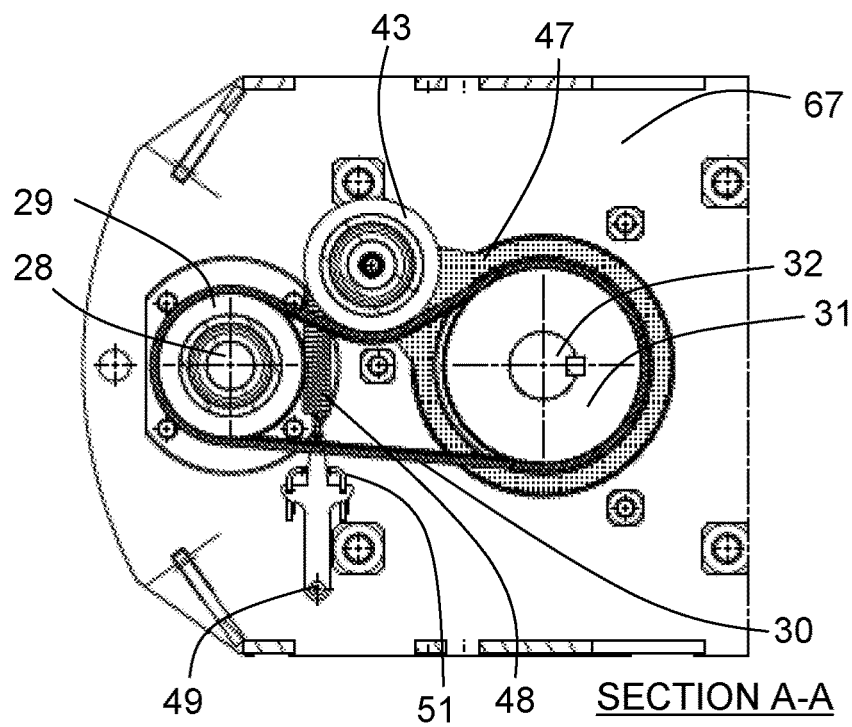
FIG. 9 shows a first section view of the transmission arrangement.

As indicated with arrows A1, A2 in FIG. 11, the first endless belt 26 and the second endless belt 30 need to be subject of a certain tension. With reference to FIG. 9, FIG. 10 and FIG. 14, this tension is inflicted by means of corresponding tension pulleys, a first tension pulley 42 and a second tension pulley 43.

The first tension pulley 42 is rotatably mounted to a first pressure part 44 that is pivotably mounted to the engine axle 24, where the first pressure part 44 is connected to a first spring 45 that is adapted to exert a spring load at the first pressure part 44 such that the first tension pulley 42 is pressed towards the first endless belt 26. By means of a first releasable handle 46, a user can release the spring load at the first pressure part 44 such that the first tension pulley 42 releases the first endless belt 26, for example when the first endless belt 26 is replaced.

Correspondingly, the second tension pulley 43 is rotatably mounted to a second pressure part 47 that is pivotably mounted to the second pulley axle 32, where the second pressure part 47 is connected to a second spring 48 that is adapted to exert a spring load at the second pressure part 47 such that the second tension pulley 43 is pressed towards the second endless belt 30. By means of a second releasable handle 49, a user can release the spring load at the second pressure part 47 such that the second tension pulley 43 releases the second endless belt 30, for example when the second endless belt 30 is replaced.

At least one of the pressure parts 44, 47 are according to some aspects pivotably mounted around another pulley axle than the ones described above, for example the second pressure part 47 can be pivotably mounted to the first pulley axle 28 instead as will be described in a further example.

The tension pulleys 42, 43 are both mounted such that they contact the corresponding endless belt 26, 30 after the corresponding pulley axle 24, 28 in the direction of the corresponding belt's movement. More in detail, the first tension pulley 42 is mounted such that it contacts the first endless belt 26 after the engine axle 24 in the direction of the first endless belt's running movement, and the second tension pulley 43 is mounted such that it contacts the second endless belt 30 after the first pulley axle 28 in the direction of the second endless belt's running movement.

Figure 12A:
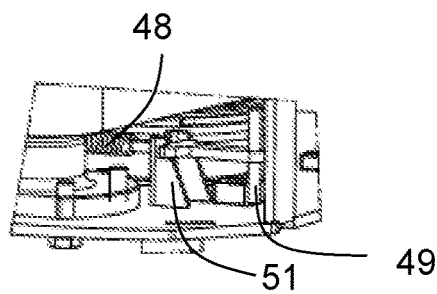
FIG. 12A shows a releasable handle in a hooked position.
Figure 12B:
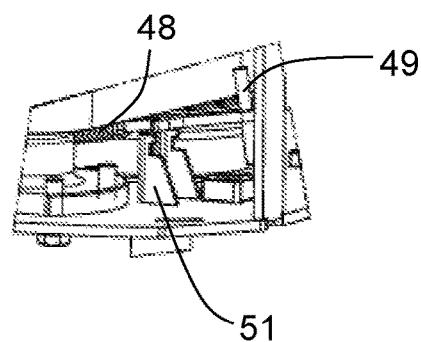
FIG. 12B shows a releasable handle in an unhooked position.

Each one of the tension pulleys 42, 43 is thus adapted to rotate around the same axis as one of the pulleys 25, 27. The belt tensioner springs 45, 48 have thus been equipped with handles 46, 49 for easy tensioning and releasing the endless belts 26, 30. When an endless belt 26, 30 is tensioned, the corresponding handle 46, 49 is hooked in a bracket 50, 51 placed to provide the intended spring force, and at the same time enable easy access for a user to unhook it from outside of the gearbox casing when servicing the machine. This is illustrated for the second releasable handle 49 in FIG. 12a in a hooked position and in FIG. 12b in an unhooked position.

An active spring loaded belt tensioner is thus provided that gives longer life time of the endless belts 26, 30. Having the same rotational axis for the pressure parts 44, 47 as one of the pulleys 25, 27 provides a compact design. The handles 46, 49 connected to the belt tensioner springs 45, 48 makes the tensioning and release of the tensioning easier.

Figure 16:
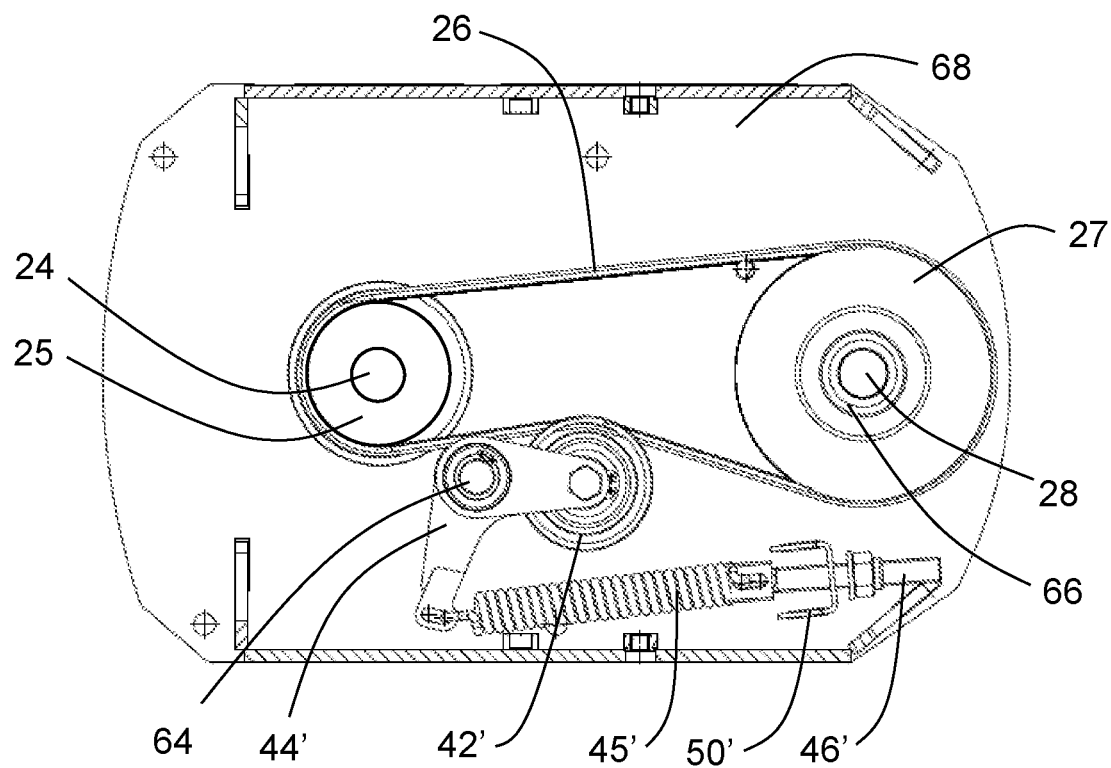
FIG. 16 shows a further example and corresponds to FIG. 10.
Figure 17:
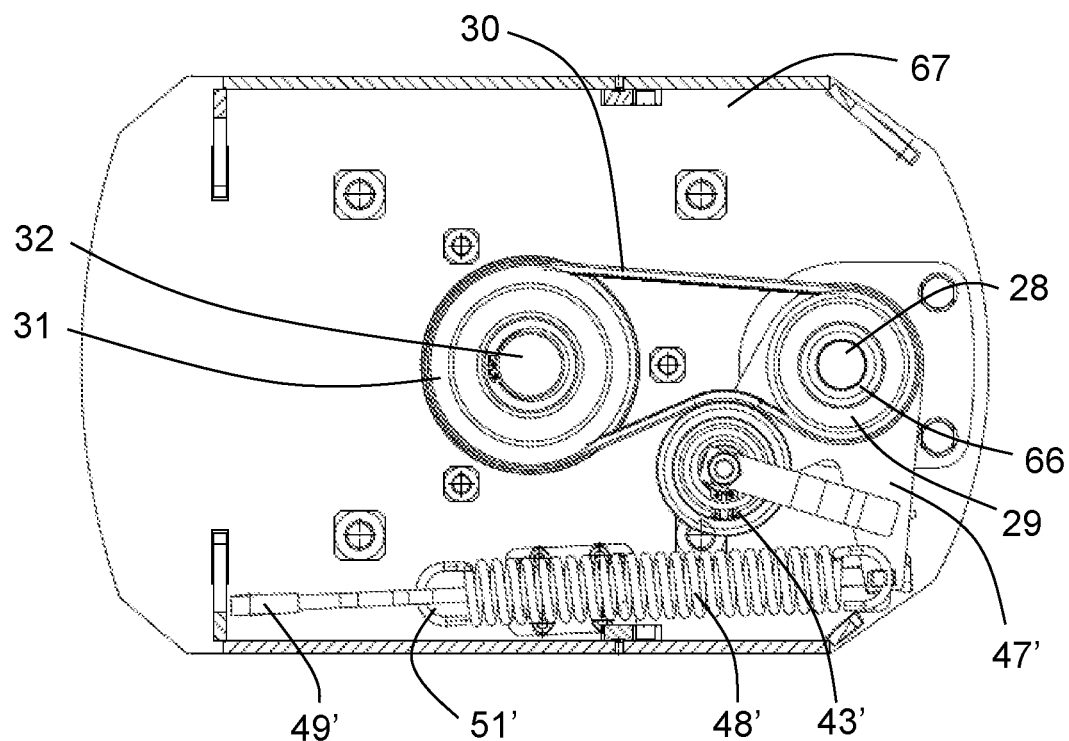
FIG. 17 shows a further example and corresponds to FIG. 9.
Figure 18:
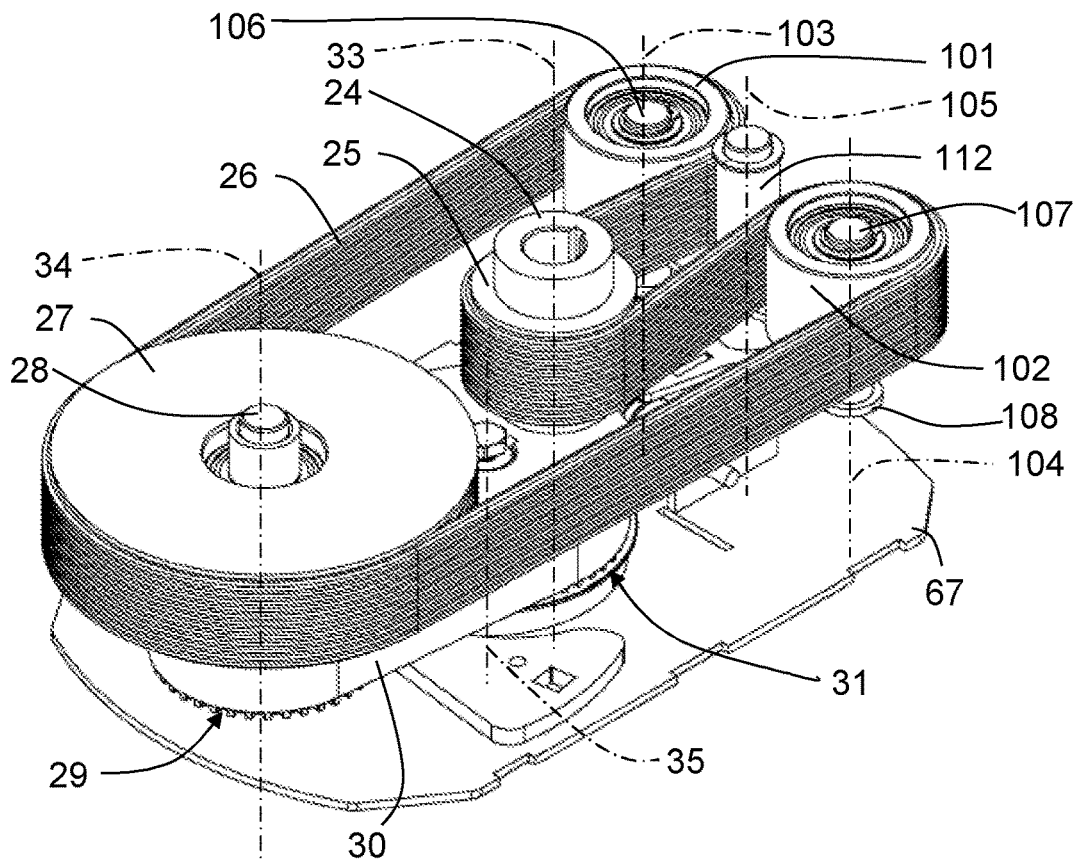
FIG. 18 shows a schematic perspective view of a first example of an alternative transmission arrangement with a belt.

With reference to FIG. 16 and FIG. 17, where FIG. 16 corresponds to FIG. 10 and FIG. 17 corresponds to FIG. 9, an alternative example will be described. As indicated with the arrows A1, A2 in FIG. 11, the first endless belt 26 and the second endless belt 30 need to be subject of a certain tension that here is inflicted by means of corresponding tension pulleys, a first tension pulley 42' and a second tension pulley 43'.

In this example, according to some aspects, the first tension pulley 42' is rotatably mounted to a first pressure part 44' that is pivotably mounted to a separate pivot axle 64, where the first pressure part 44' is connected to a first spring 45' that is adapted to exert a spring load at the first pressure part 44' such that the first tension pulley 42' is pressed towards the first endless belt 26. By means of a first releasable handle 46', a user can release the spring load at the first pressure part 44' such that the first tension pulley 42' releases the first endless belt 26, for example when the first endless belt 26 is replaced.

Correspondingly, the second tension pulley 43' is rotatably mounted to a second pressure part 47' that is pivotably mounted to the first pulley axle 28, where the second pressure part 47' is connected to a second spring 48' that is adapted to exert a spring load at the second pressure part 47' such that the second tension pulley 43' is pressed towards the second endless belt 30. By means of a second releasable handle 49', a user can release the spring load at the second pressure part 47' such that the second tension pulley 43' releases the second endless belt 30, for example when the second endless belt 30 is replaced.

As described for the previous example, the tension pulleys 42', 43' are both mounted such that they contact the corresponding endless belt 26, 30 after the corresponding driving axle 24, 28 in the direction of the corresponding belt's movement.

The belt tensioner springs 45', 48' have been equipped with handles 46', 49' for easy tensioning and releasing the endless belts 26, 30. When an endless belt 26, 30 is tensioned, the corresponding handle 46', 49' is hooked in a corresponding bracket 50', 51' placed to provide the intended spring force, and at the same time enable easy access for a user to unhook it from outside of the gearbox casing when servicing the machine.

According to some aspects, with reference also to FIG. 11, the second pressure part 47' is instead pivotably mounted to the intermediate part 65. In that case, there should be a bearing arrangement positioned between the second pressure part 47' and the intermediate part 65.

Generally, the second pressure part 47, 47' is rotatable about the second axis 34, and is thus at least indirectly pivotably mounted to the first pulley axle 28. The mounting is for example indirect when the second pressure part 47' is pivotably mounted to the intermediate part 65.

For all these kinds of arrangements, according to some aspects, in dependence of the spring force, other types of arrangements for tensioning and releasing the endless belts 26, 30 are used, for example a threaded rod and a nut, where tensioning and un-tensioning is performed by rotating the nut.

In view of the above examples, at least one pressure parts 44, 47; 44', 47' has the same rotational axis as one of the pulleys 25, 27; 25', 27'. Generally, at least one tension pulley 42, 43; 42', 43' is rotatably mounted to a corresponding pressure part 44, 47; 44', 47' that at least indirectly is pivotably mounted to a corresponding pressure part axle 24, 32; 28, 64, 65, preferably via a bearing arrangement, where each pressure part 44, 47; 44', 47' is connected to a corresponding spring 45, 48; 45', 48' that is adapted to exert a spring load at the corresponding pressure part 44, 47; 44', 47' such that each tension pulley 42, 43; 42', 43' is pressed towards a corresponding endless power transferring means 26, 30, here in the form of an endless belt. According to some aspects, at least one pressure part axle is constituted a by a pulley axle 28, 32, by an intermediate part 65 connecting belt pulleys 27, 29 that are rotatable around a common axis 34, or by the motor axle 24.

With reference to FIG. 13 and FIG. 14, in order to ease the maintenance of the transmission arrangement 38, the internal parts of the transmission arrangement 38 have been divided into smaller subassemblies 52, 53, 54 that can be removed from the floor surfacing machine 1 individually, according to some aspects by releasing holding screws at the underside of the dust cover 37. This means that there is no need to demount the engine or the frame if for example a pulley or a bearing needs to be replaced.

With reference to FIG. 18-21, a first example of an alternative transmission arrangement 113 is shown. In a manner similar to the one previously described, the transmission arrangement 113 comprises a first axle 24 that is rotatable about a first axis 33 and is connected to a first pulley 25 that is arranged to drive an endless power transferring means 26. The endless power transferring means 26 is according to some aspects in the form of an endless belt that further is adapted to drive a second pulley 27 that is rotatable about a second axis 34. The transmission arrangement 113 comprises a first idle pulley 101 and a second idle pulley 102 which both are adapted to guide the endless power transferring means 26, where the first idle pulley 101 is rotatable around a first idle pulley axis 103 and the second idle pulley 102 is rotatable around a second idle pulley axis 104. The distance between the idle pulley axes 103, 104 is fixed and the idle pulley axes 103, 104 are pivotable around a common pivot axis 105. In accordance with the present disclosure, the first pulley 25 is positioned between the idle pulleys 101, 102 and the second pulley 27, such that a distance between any one of the idle pulley axes 103, 104 and the second axis 34 exceeds a distance between any one of the idle pulley axes 103, 104 and the first axis 33.

This means that if a driving pulley, such as for example the first pulley 25, inflicts jerks in the endless power transferring means 26, these jerks are absorbed by means of the idle pulleys 101, 102 as they pivot around a common pivot axis 105. Such jerks can be inflicted by means of the driving pulley if the driving pulley in turn is propelled by means combustion engine, in particular a single cylinder combustion engine. By means of the idle pulleys 101, 102, the effect of such jerks reduced, which prolongs the life of the endless power transferring means 26.

According to some aspects, the first pulley 25 is positioned between the common pivot axis 105 and the second pulley 27, such that a distance between the pivot axis 105 and the second axis 34 exceeds a distance between the common pivot axis 105 and the first axis 33.

According to some aspects, the second axis 34, the first axis 33 and the pivot axis 105 are adapted to run in a common plane.

According to some aspects, the common pivot axis 105 runs through a pivot axle 112 that is positioned between the idle pulleys 101, 102.

Figure 21:
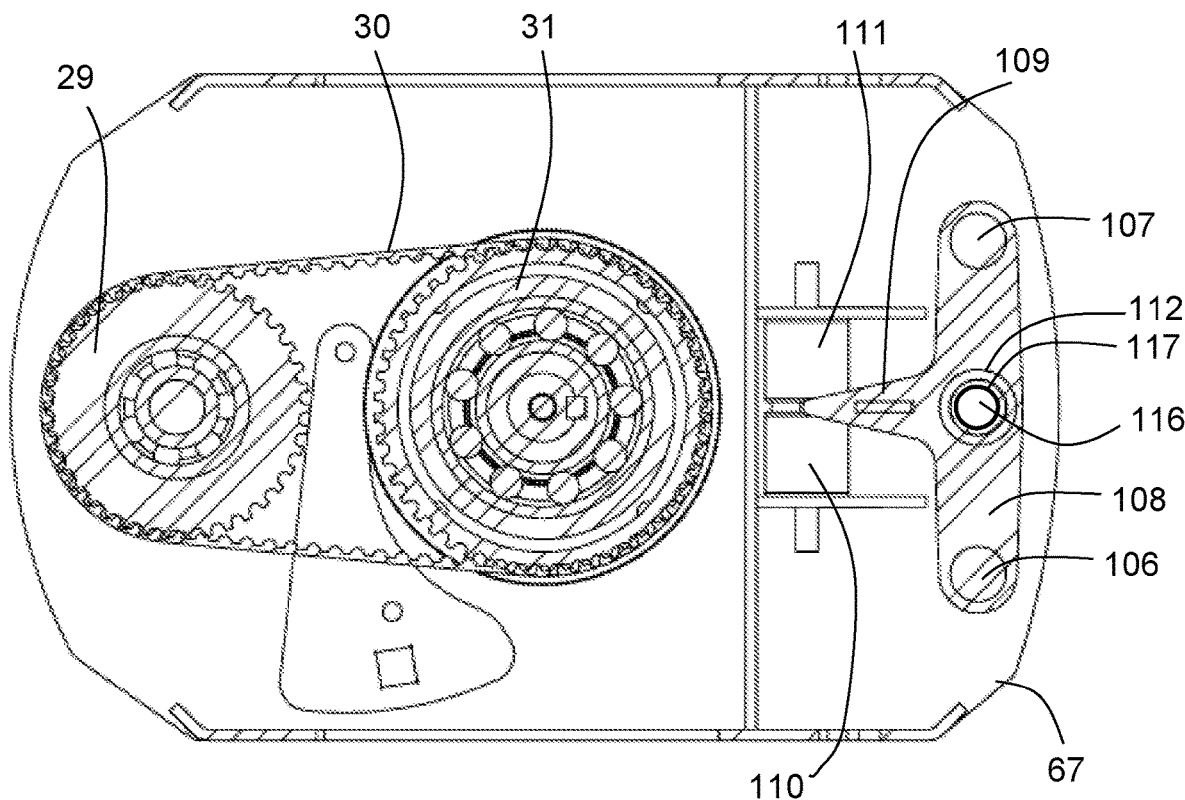
FIG. 21 shows a schematic section view of the first example of an alternative transmission arrangement.
Figure 24:
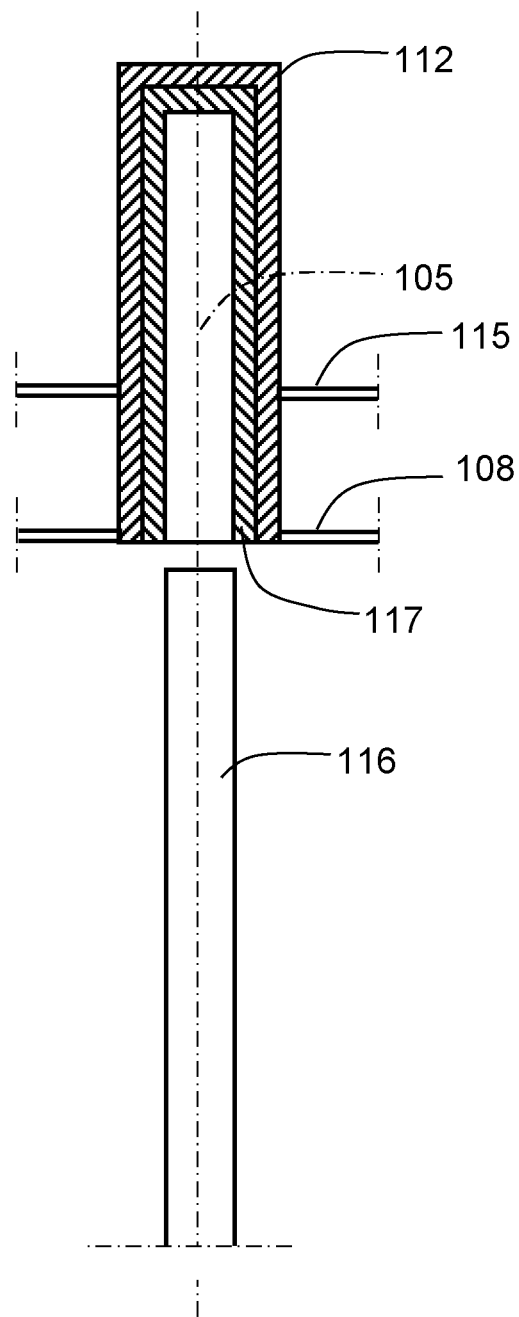
FIG. 24 shows a schematic section view of a pivot axle that comprises an elastomeric insert.

According to some aspects, with reference to FIG. 21 and FIG. 24, the pivot axle 112 comprises an elastomeric insert 117 that provides an elastic fastening of the pivot axle 112 relative the first axis 33 and the second axis 34. The pivot axle 112 is at least partly hollow, with the elastomeric insert 117 in the hollow part, and thread onto an inner axle 116 that is fixed relative the first axis 33 and the second axis 34. The elastomeric insert 117 is thus sandwiched between the pivot axle 112 and the inner axle 116. This means that the pivot axle 112 and the idle pulleys 101, 102 can move in relation to the inner axle 116 as well as the first axis 33 and the second axis 34 by means of the elastomeric insert being resiliently deformed. According to some aspects, the elastomeric insert 117 is formed in a rubber material. The jerks mentioned above are absorbed by means of the idle pulleys 101, 102 as they pivot around a common pivot axis 105, and by the elastomeric insert being resiliently deformed.

Many other types of arrangements using an elastomeric insert are of course conceivable, such inserts being well-known in the art.

According to some aspects, each idle pulley 101, 102 is connected to a corresponding pulley axle 106, 107 through which the corresponding pulley axis 103, 104 runs, where the pulley axles 106, 107 are attached to holding means 108 that is pivotable around the common pivot axis 105. In this manner the idle pulley 101, 102 are maintained in a fixed manner relative each other.

According to some aspects, the holding means is preferably a plate 108 and comprises a tongue part 109 that is movable between a first resilient part 110 and a second resilient part 111.

According to some aspects, the holding means is preferably a plate 108 and comprises a tongue part 109 that is held between and in contact with a first resilient part 110 and a second resilient part 111.

According to some aspects, the plate and the tongue part 109 are formed as an integral part. The jerks mentioned above are absorbed by means of the idle pulleys 101, 102 as they pivot around a common pivot axis 105 and the tongue 109 moves more or less in engagement with the resilient parts 110, 111. According to some aspects, the resilient parts 110, 111 are formed in a rubber material.

Figure 19:
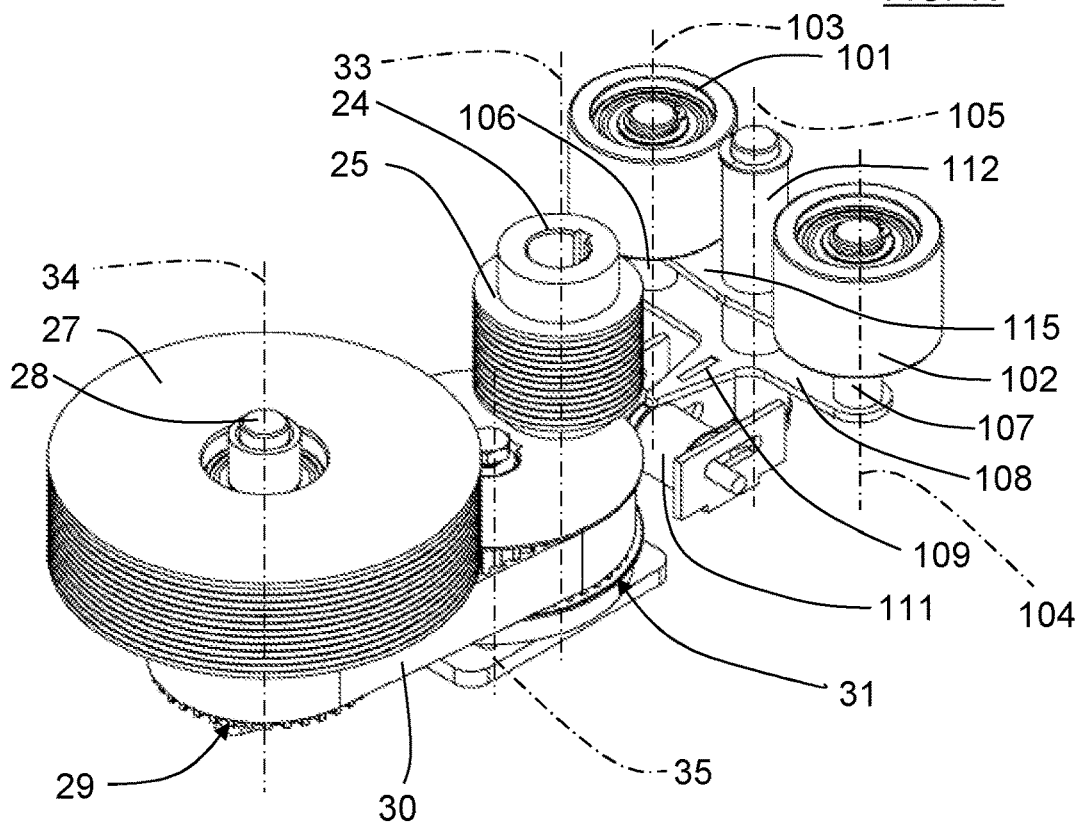
FIG. 19 shows a schematic perspective view of the first example of an alternative transmission arrangement without a belt.
Figure 20:
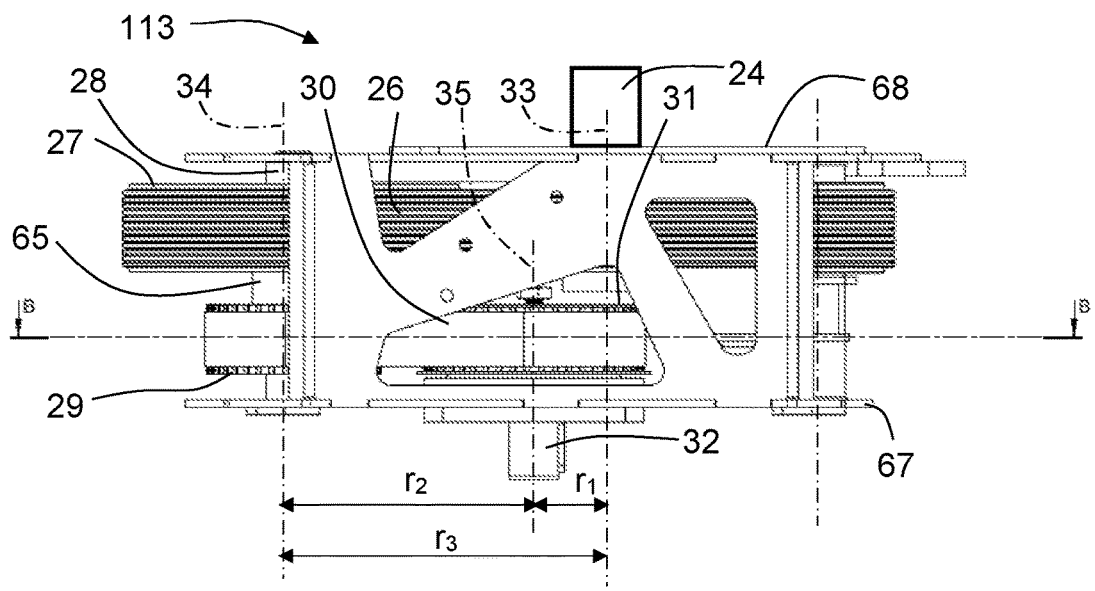
FIG. 20 shows a schematic side view of the first example of an alternative transmission arrangement.

As shown in FIGS. 19 and 24, according to some aspects, the pivot axle 112 as well as the pulley axles 106, 107 run via an intermediate supporting plate 115. This plate 115 adds increased stability.

According to some aspects, the first pulley 25 and the second pulley 27 are in contact with opposite sides of the endless power transferring means 26. This means that a double-sided Poly V-type belt can be used, which in turn means that the belt is worn on two sides, i.e. the double area, which leads to a longer belt life.

Figure 22:
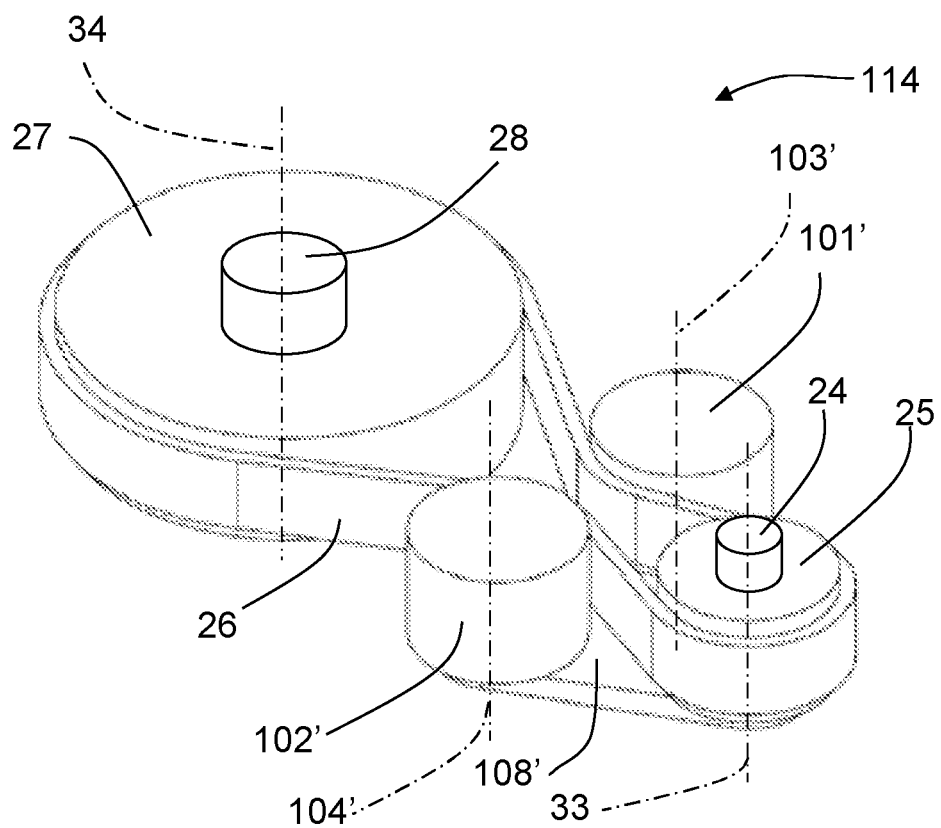
FIG. 22 shows a schematic perspective view of a second example of an alternative transmission arrangement.
Figure 23:
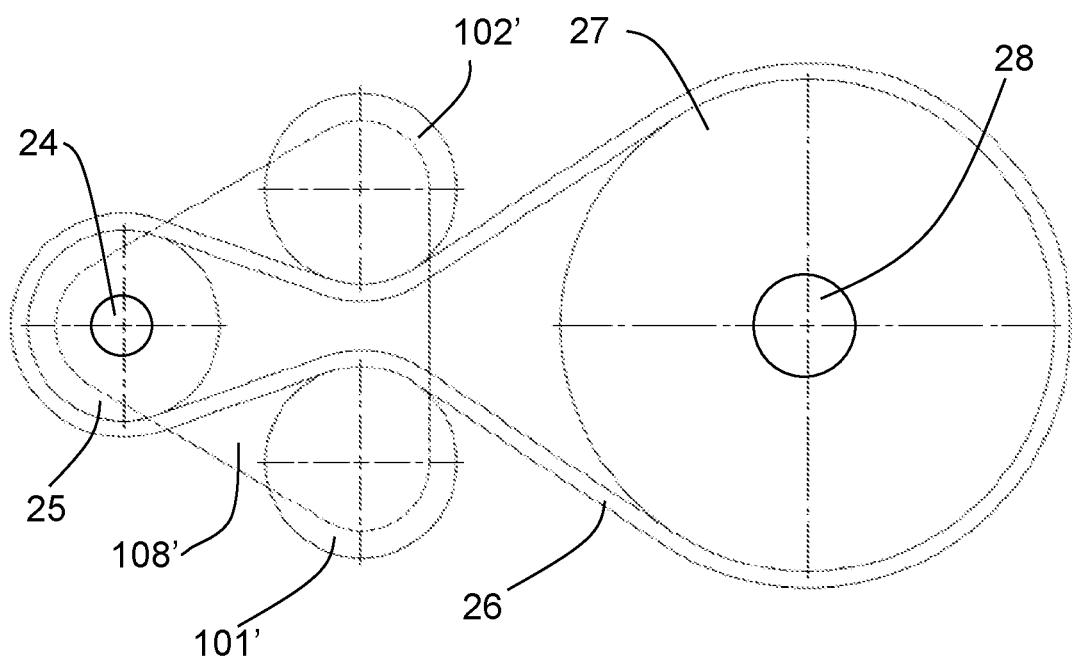
FIG. 23 shows a schematic top view of the second example of the alternative transmission arrangement.

With reference to FIG. 22-23, a second example of an alternative transmission arrangement 114 is shown. In a manner similar to the one previously described, the transmission arrangement 113 comprises a first axle 24 that is rotatable about a first axis 33 and is connected to a first pulley 25 that is arranged to drive an endless power transferring means 26. The endless power transferring means 26 is according to some aspects in the form of an endless belt that further is adapted to drive a second pulley 27 that is rotatable about a second axis 34.

The transmission arrangement 114 comprises a first idle pulley 101' and a second idle pulley 102' which both are adapted to guide the endless power transferring means 26, where the first idle pulley 101' is rotatable around a first idle pulley axis 103' and the second idle pulley 102' is rotatable around a second idle pulley axis 104'. The distance between the idle pulley axes 103', 104' is fixed, and the idle pulley axes 103', 104' are pivotable around the first axis 33.

In the same way as for the first example of an alternative transmission arrangement 113, if a driving pulley, such as for example the first pulley 25, inflicts jerks in the endless power transferring means 26, according to this second example of an alternative transmission arrangement 114, these jerks are absorbed by means of the idle pulleys 101', 102' as they pivot around a common pivot axis 33 that here is the same as the first axis 33 around which the first axle 24 and the first pulley 25 are rotatable. As mentioned above, such jerks can be inflicted by means of the driving pulley if the driving pulley in turn is propelled by means of a combustion engine, in particular a single cylinder combustion engine. By means of the idle pulleys 101, 102, the effect of such jerks reduced, which prolongs the life of the endless power transferring means 26.

According to some aspects, the idle pulleys 101', 102' are positioned between the first pulley 25 and the second pulley 27, such that a distance between any one of the first axis 33 and the second axis 34, and any one of the idle pulley axes 103', 104', falls below a distance between the first axis 33 and the second axis 34.

According to some aspects, the first pulley 25 and the second pulley 27 are in contact with one side of the endless power transferring means 26, and the idle pulleys 101', 102' are in contact with an opposite side of the endless power transferring means 26.

According to some aspects, for both the alternative transmission arrangements 113, 114, there are further pulleys and a second power transferring means as for the previous examples of transmission arrangements. This is illustrated for the first alternative transmission arrangement 113 in FIG. 18-21, but is also applicable for the alternative transmission arrangement 114 although not shown in FIG. 22-23.

This means that, according to some aspects, for both the alternative transmission arrangements 113, 114 described above, the second pulley 27 is connected to a third pulley 29 that is arranged to drive a second endless power transferring means 30 that further is adapted to drive a fourth pulley 31 that is connected to a second pulley axle 32 that is rotatable about a third axis 35. The first axis 33, the second axis 34 and the third axis 35 are all adapted to run mutually parallel such that there is a shortest first distance $r_1$ between the first axis 33 and the third axis 35, such that there is a shortest second distance $r_2$ between the second axis 34 and the third axis 35, and such that there is a shortest third distance $r_3$ between the first axis 33 and the second axis 34, where the first distance $r_1$ falls below the third distance $r_3$.

According to some aspects, the first distance $r_1$ falls below the second distance $r_2$.

According to some aspects, first distance $r_1$ equals zero, such that the first axis 33 and the third axis 35 coincide.

According to some aspects, the second distance $r_2$ falls below the third distance $r_3$.

According to some aspects, the first axis 33, the second axis 34 and the third axis 35 are adapted to run in a common plane.

According to some aspects, the first endless power transferring means 26 has a length that exceeds the length of the second endless power transferring means 30.

According to some aspects, the power transferring means 26, 30 are in the form of endless belts.

According to some aspects, the endless belts 26, 30 are of a Poly V-type and have a PK or DPK dimension.

According to some aspects, the first endless belt 26 is of a Poly V-type and have a PK or DPK dimension, and that the second endless belt 30 is a toothed belt.

The transmission arrangements 113, 114 with idle pulleys 101, 102; 101', 102' described above can according to some aspects be combined with the tension pulleys 42, 43; 42' 43' described previously The present disclosure also relates to a floor surfacing machine 1 comprising a transmission arrangement 113, 114 according to the two alternative transmission arrangements 113, 114 described above.

According to some aspects, the floor surfacing machine 1 is a grinding machine.

More in detail, according to some aspects, such a floor surfacing machine 1 can comprise such an alternative transmission arrangements 113, 114 where idle pulleys 101, 102; 101', 102' are used for either the first endless power transferring means 26 or the second endless power transferring means 30. Idle pulleys can alternatively be used for both endless power transferring means 26.

The present disclosure is not limited to the above, but may vary freely within the scope of the dependent claims. For example, tool holder disc 6 may be arranged for any suitable type of surfacing; being equipped for grinding, sanding, scrubbing or polishing. The number of wheels 3, 4 may vary, but there are at least two wheels.

According to some aspects, the endless belts 26, 30 are of a Poly V-type and have a PK or DPK dimension.

The endless belts can be constituted by any type of endlessly running power transferring means such as drive chains.

According to some aspects, the first endless power transferring means 26 has a length that exceed the length of the second endless power transferring means 30.

The engine axle 24 is according to some aspects a continuation of the drive shaft.

According to some aspects, each spring plate is generally constituted by a biasing member 23.

According to some aspects, the combustion engine is constituted by another type of motor, such as an electric motor. Generally, the engine axle is constituted by a motor axle.

According to some aspects, the floor surfacing machine 1 is a grinding machine.

Generally, the present disclosure relates to a floor surfacing machine 1 comprising a frame 2 that is carried by at least two wheels 3, 4. The floor surfacing machine 1 further comprises a motor 8 and a tool holder disc 6 adapted to be driven by the motor 8 and having a rotational center 13, a bottom side 6a that is adapted to face a ground surface 5 and a plurality of grooves 10, 12 that extend radially from said rotational center 13. Each groove 10, 12 has a conical shape tapering radially outwards from said rotational center 13 and inclined inner walls 21, 22 propagating away from said rotational center 13, where each groove 10, 12 is adapted to receive a corresponding detachably mountable gripping member 18 comprised in a carrier plate 16 carrying abrasive elements 17. Each gripping member 18 has a conical shape tapering radially outwards from said rotational center 13 when mounted and two side walls 19, 20 which have an inclination that is arranged to correspond to the inclination of the inclined inner walls 21, 22 of the grooves 10, 12. The tool holder disc 6 comprises a biasing member 23 for at least one groove 10, 12, where each biasing member 23 is adapted to protrude into a corresponding groove 10, 12 and prevent a corresponding gripping member 18 from sliding out of the groove 10, 12 when mounted. Each biasing member 23 is constituted by a spring plate 23 that comprises a pressure member 23a that is adapted to act on at least an edge of an inner side 18a of the gripping member 18 when mounted, where said inner side 18a is facing the rotational center 13 of the tool holder disc 6 when mounted. The pressure member 23a either always will contact the inner side 18a of the gripping member 18 when mounted, or only when the gripping member 18 is moved from a working position of the corresponding groove 10, 12. When the pressure member 23a is in contact with the inner side 18a of the gripping member 18, it is adapted to prevent further movement of the gripping member 18 until a spring force of the pressure member 23a is overcome by continued movement of the gripping member 18, enabling the carrier plate 16 to be released.

When the pressure member is in contact with the inner side of the gripping member, it is adapted to prevent further movement of the gripping member until a spring force of the pressure member is overcome by continued movement of the gripping member, enabling the carrier plate to be released.

This enables the carrier plate to be released in an uncomplicated manner, only needing the use of one hand.

According to some aspects, when a carrier plate 16 is mounted to a groove 10, 12, it is radially pulled toward an outermost narrower portion of the chosen groove 10, 12 under the load of a pressure member 23a of the spring plate 23 towards an upper side 18b of the gripping member 18, and when sufficiently pulled toward the outermost narrower portion of the chosen groove 10, 12, the pressure member 23a is adapted to leave the upper side 18b of the gripping member 18 and act on an inner side 18a of the gripping member 18.

According to some aspects, each spring plate 23 comprises two side parts 60, 61 that extend out from a corresponding groove 12 and are attached to the tool holder disc 6 with appropriate attachment elements 62, 63.

According to some aspects, the floor surfacing machine 1 comprises an engine mounting bracket 36 to which the motor 8 is mounted, and a dust cover 37 that is adapted to partially enclose the tool holder disc 6, leaving at least the bottom side 6a uncovered such that it is enabled to contact the ground surface 5.

According to some aspects, the pressure member 23a will contact the inner side 18a of the gripping member 18 when the gripping member 18 is moved from a working position at the outermost narrower portion of the chosen groove 10, 12.

Generally, the present disclosure also relates to a floor surfacing machine 1 comprising a frame 2 that is carried by at least two wheels 3, 4, where the floor surfacing machine 1 further comprises a motor 8 and a tool holder disc 6 adapted to be driven by the motor 8, where the motor 8 comprises a motor axle 24 that is rotatable about a first axis 33 and is connected to a first pulley 25 that is arranged to drive a first endless power transferring means 26 that further is adapted to drive a second pulley 27 that is rotatable about a second axis 34, where a first pulley axle 28 is running along the second axis 34 where the second pulley 27 further is connected to a third pulley 29 that is mounted closer to the tool holder disc 6 than the second pulley 27, and that is arranged to drive a second endless power transferring means 30 that further is adapted to drive a fourth pulley 31 that is connected to a second pulley axle 32 that is rotatable about a third axis 35, where the second pulley axle 32 is adapted to propel the tool holder disc 6, and where the first axis 33, the second axis 34 and the third axis 35 are all adapted to run mutually parallel such that there is a shortest first distance $r_1$ between the first axis 33 and the third axis 35, such that there is a shortest second distance $r_2$ between the second axis 34 and the third axis 35, and such that there is a shortest third distance $r_3$ between the first axis 33 and the second axis 34, where the first distance $r_1$ falls below the third distance $r_3$.

In accordance with aspects of the present disclosure, the floor surfacing machine 1 comprises an engine mounting bracket 36 to which the motor 8 is mounted, and a dust cover 37 that is adapted to partially enclose the tool holder disc 6, leaving at least the bottom side 6a uncovered such that it is enabled to contact the ground surface 5, where a compact transmission arrangement 38, comprising said axles 24, 28, 32, said pulleys 25, 27, 29, 31 and said endless power transferring means 26, 30, is positioned between the engine mounting bracket 36 and the dust cover 37 such that an integrated front part 39 is formed and connected to the frame 2 in a pivoting manner.

In this manner, the frame, which is carried by at least two wheels, is connected to the integrated front part in a pivoting manner. The integrated front part is formed from:
- an engine mounting bracket to which the motor is mounted;
- a dust cover that is adapted to partially enclose the tool holder disc, leaving at least the bottom side uncovered such that it is enabled to contact the ground surface;
- a compact transmission arrangement comprising said axles, said pulleys and said endless power transferring means, which is positioned between the engine mounting bracket and the dust cover.

By means of this arrangement, the center of gravity of the compact integrated front part can be placed in, or at least relatively close to, a pivoting axis connecting the dust cover to the frame. The dust cover will strive to have a positon relative the frame where the tool holder disc obtains the most complete contact with the ground that is possible, dispensing with any need of wheel adjustment when changing abrasive elements and their associated carrier plates.

There will thus be no need to adjust the wheel axle height after every tool change, and the floor surfacing machine will grind smoothly across the whole tool holder disc's lower surface, from changing to new tools until completely worn tools, not requiring any user adjustments.

In accordance with other aspects of the present disclosure, the second distance $r_2$ falls below the third distance $r_3$, and according to some further aspects, the first endless power transferring means 26 has a length that exceeds the length of the second endless power transferring means 30.

In this manner, the jerks mentioned above, and its effects, can be alleviated by means of having a relatively long endless power transferring means 26. The length will provide better properties regarding handling tension increase in the endless power transferring means 26

According to some aspects, the first distance $r_1$ falls below the second distance $r_2$.

According to some aspects, the first distance $r_1$ equals zero, such that the first axis 33 and the third axis 35 coincide.

According to some aspects, the first axis 33, the second axis 34 and the third axis 35 are adapted to run in a common plane.

According to some aspects, the first endless power transferring means 26 has a length that exceeds the length of the second endless power transferring means 30 with a factor that lies between 1.5 and 3.0.

According to some aspects, the first endless power transferring means 26 has a length that exceeds the length of the second endless power transferring means 30 with a factor that lies between 2.0 and 2.5.

According to some aspects, the first belt pulley 25 has a first outer diameter $d_1$, the second belt pulley 27 has a second outer diameter $d_2$, the third belt pulley 29 has a third outer diameter $d_3$ and the fourth belt pulley 31 has a fourth outer diameter $d_4$, where the second outer diameter $d_2$ exceeds the first outer diameter $d_1$, and the fourth outer diameter $d_4$ exceeds the third outer diameter $d_3$.

According to some aspects, the floor surfacing machine 1 comprises a first tension pulley 42, 42' and a second tension pulley 43, 43', where each tension pulley 42, 43; 42', 43' is adapted to inflict a releasable pressure on a corresponding endless power transferring means 26, 30.

According to some aspects, at least one tension pulley 42, 43; 42', 43' is rotatably mounted to a corresponding pressure part 44, 47; 44', 47' that at least indirectly is pivotably mounted to a corresponding pressure part axle 24, 32; 28 64, where each pressure part 44, 47; 44', 47' is connected to a corresponding spring 45, 48; 45', 48' that is adapted to exert a spring load at the corresponding pressure part 44, 47; 44', 47' such that each tension pulley 42, 43; 42', 43' is pressed towards a corresponding endless power transferring means 26, 30, where at least one pressure part axle is constituted either by a pulley axle 28, 32, by an intermediate part 65 connecting belt pulleys 27, 29 that are rotatable around a common axis 34, or by the motor axle 24.

According to some aspects, the first tension pulley 42 is rotatably mounted to a first pressure part 44 that is pivotably mounted to the motor axle 24, where the first pressure part 44 is connected to a first spring 45 that is adapted to exert a spring load at the first pressure part 44 such that the first tension pulley 42 is pressed towards the first endless power transferring means 26, and in that the second tension pulley 43 is rotatably mounted to a second pressure part 47 that is pivotably mounted to the second pulley axle 32, where the second pressure part 47 is connected to a second spring 48 that is adapted to exert a spring load at the second pressure part 47 such that the second tension pulley 43 is pressed towards the second endless power transferring means 30.

According to some aspects, each spring 45, 48; 45', 48' is connected to a corresponding releasable handle 46, 47; 46', 47', where each releasable handle 46, 47; 46', 47' is releasably attachable to a corresponding bracket 50, 51; 50', 51'.

According to some aspects, the dust cover 37 comprises a first mounting flange 40 and a second mounting flange 41, which mounting flanges 40, 41 extend towards the engine mounting bracket 36 and are connected to the frame 2 in a pivoting manner by means of connecting pins 56, 57.

According to some aspects, the transmission arrangement 38 comprises a plurality of subassemblies 52, 53, 54 that can be removed from the floor surfacing machine 1 individually.

According to some aspects, the floor surfacing machine 1 is a grinding machine.

According to some aspects, the first endless power transferring means 26 has a length that exceed the length of the second endless power transferring means 30.

According to some aspects, the power transferring means 26, 30 are in the form of endless belts.

According to some aspects, the endless belts 26, 30 are of a Poly V-type and have a PK or DPK dimension.

According to some aspects, the floor surfacing machine 1 comprises a first idle pulley 101, 101' and a second idle pulley 102, 102' which both are adapted to guide one of the endless power transferring means 26, 30, where the first idle pulley 101, 101' is rotatable around a first idle pulley axis 103, 103' and the second idle pulley 102, 102' is rotatable around a second idle pulley axis 104, 104', where the distance between the idle pulley axes 103, 104; 103', 104' is fixed, and where the idle pulley axes 103, 104; 103', 104' are pivotable around a common pivot axis 105, 33.

This means that there can be one set of idle pulleys 101, 102; 101', 102' adapted for any one of the endless power transferring means 26, 30. This also means that there can be one set of idle pulleys 101, 102; 101', 102' adapted for each one of the endless power transferring means 26, 30, such that both endless power transferring means 26, 30 are guided by two idle pulleys 101, 102; 101', 102'.

According to some aspects, each idle pulley 101, 102; 101', 102' is connected to a corresponding pulley axle 106, 107; 106', 107' through which the corresponding pulley axis 103, 104; 103', 104' runs, where the pulley axles 106, 107; 106', 107' are attached to a holding means 108, 108' that is pivotable around the common pivot axis 105, 33.

According to some aspects, the holding means is a plate 108 that comprises a tongue part 109 that is movable between a first resilient part 110 and a second resilient part 111.

According to some aspects, the holding means is a plate 108 that comprises a tongue part 109 that is held between, and in contact with, a first resilient part 110 and a second resilient part 111.

According to some aspects, the idle pulleys 101, 102 are adapted to guide the first endless power transferring means 26, where the first pulley 25 is positioned between the idle pulleys 101, 102 and the second pulley 27 such that a distance between any one of the idle pulley axes 103, 104 and the second axis 34 exceeds a distance between any one of the idle pulley axes 103, 104 and the first axis 33.

According to some aspects, the first pulley 25 is positioned between the common pivot axis 105 and the second pulley 27 such that a distance between the pivot axis 105 and the second axis 34 exceeds a distance between the pivot axis 105 and the first axis 33.

According to some aspects, the common pivot axis 105 runs through a pivot axle 112 that is positioned between the idle pulleys 101, 102.

According to some aspects, the pivot axle 112 comprises an elastomeric insert 117 that provides an elastic fastening of the pivot axle 112 relative the first axis 33 and the second axis 34.

According to some aspects, the common pivot axis is the first axis 33, where the first pulley 25 is positioned between the idle pulleys 101', 102' and the second pulley 27.

According to some aspects, the idle pulleys 101, 102 are adapted to guide the first endless power transferring means 26, where the first pulley 25 and the second pulley 27 are in contact with one side of the first endless power transferring means 26, and that the idle pulleys 101', 102' are in contact with an opposite side of the first endless power transferring means 26.

Generally, the present disclosure also relates to a floor surfacing machine 1 comprising a frame 2 that is carried by at least two wheels 3, 4, where the floor surfacing machine 1 further comprises a motor 8 and a tool holder disc 6 adapted to be driven by the motor 8 via two endless power transferring means 26, 30 that connect respective opposing pulleys 25, 27; 29, 31 that are associated with corresponding pulley axles 24, 28, 32, where the floor surfacing machine 1 comprises a first tension pulley 42, 42' and a second tension pulley 43, 43', where each tension pulley 42, 43; 42', 43' is adapted to inflict a releasable pressure on a corresponding endless power transferring means 26, 30. At least one tension pulley 42, 43; 42', 43' is rotatably mounted to a corresponding pressure part 44, 47; 44', 47' that is pivotably mounted to a corresponding pressure part axle 24, 32; 28 64, where each pressure part 44, 47; 44', 47' is connected to a corresponding spring 45, 48; 45', 48' that is adapted to exert a spring load at the corresponding pressure part 44, 47; 44', 47' such that each tension pulley 42, 43; 42', 43' is pressed towards a corresponding endless power transferring means 26, 30, where at least one pressure part axle is constituted either by a pulley axle 28, 32, by an intermediate part 65 connecting belt pulleys 27, 29 that are rotatable around a common axis 34, or by the motor axle 24.

According to some aspects, the motor 8 comprises a motor axle 24 that is rotatable about a first axis 33 and is connected to a first pulley 25 that is arranged to drive a first endless power transferring means 26 that further is adapted to drive a second pulley 27 that is connected to a first pulley axle 28 that is rotatable about a second axis 34, where the first pulley axle 28 further is connected to a third pulley 29 that is mounted closer to the tool holder disc 6 than the second pulley 27, and that is arranged to drive a second endless power transferring means 30 that further is adapted to drive a fourth pulley 31 that is connected to a second pulley axle 32 that is rotatable about a third axis 35, where the second pulley axle 32 is adapted to propel the tool holder disc 6.

According to some aspects, the first tension pulley 42 is rotatably mounted to a first pressure part 44 that is pivotably mounted to the motor axle 24, where the first pressure part 44 is connected to a first spring 45 that is adapted to exert a spring load at the first pressure part 44 such that the first tension pulley 42 is pressed towards the first endless power transferring means 26, and in that the second tension pulley 43 is rotatably mounted to a second pressure part 47 that is pivotably mounted to the second pulley axle 32, where the second pressure part 47 is connected to a second spring 48 that is adapted to exert a spring load at the second pressure part 47 such that the second tension pulley 43 is pressed towards the second endless power transferring means 30.

According to some aspects, the first tension pulley 42' is rotatably mounted to a first pressure part 44' that is pivotably mounted to a separate pivot axle 64, where the first pressure part 44' is connected to a first spring 45' that is adapted to exert a spring load at the first pressure part 44' such that the first tension pulley 42' is pressed towards the first endless power transferring means 26, and in that the second tension pulley 43' is rotatably mounted to a second pressure part 47' that is pivotably mounted to the first pulley axle 28, where the second pressure part 47' is connected to a second spring 48' that is adapted to exert a spring load at the second pressure part 47' such that the second tension pulley 43' is pressed towards the second endless power transferring means 30.

According to some aspects, each spring 45, 48; 45', 48' is connected to a corresponding releasable handle 46, 47; 46', 47', where each releasable handle 46, 47; 46', 47' is releasably attachable to a corresponding bracket 50, 51; 50', 51'.

The invention claimed is:

1. A floor surfacing machine comprising:
   a frame that is carried by at least two wheels,
   a combustion engine, and
   a tool holder disc adapted to be driven by the combustion engine,
   wherein the combustion engine comprises a motor axle that is rotatable about a first axis and is connected to a first pulley that is arranged to drive a first endless power transferring means that further is adapted to drive a second pulley that is rotatable about a second axis,
   wherein a first pulley axle is running along the second axis,
   wherein the second pulley further is connected to a third pulley that is mounted closer to the tool holder disc than the second pulley, and that is arranged to drive a second endless power transferring means that further is adapted to drive a fourth pulley that is connected to a second pulley axle that is rotatable about a third axis, wherein the third pulley is coaxial with the second pulley along the second axis, wherein the second pulley axle is adapted to propel the tool holder disc, wherein the first axis, the second axis and the third axis are all adapted to run mutually parallel such that there is a shortest first distance between the first axis and the third axis, such that there is a shortest second distance between the second axis and the third axis, and such that there is a shortest third distance between the first axis and the second axis, and wherein the first distance falls below the third distance and the first endless power transferring means has a length that exceeds the length of the second endless power transferring means.

2. The floor surfacing machine according to claim 1, wherein the first axis, the second axis and the third axis are adapted to run in a common plane.

3. The floor surfacing machine according to claim 1, wherein the first endless power transferring means has a length that exceeds the length of the second endless power transferring means with a factor that lies between 1.5 and 3.0.

4. The floor surfacing machine according to claim 1, wherein the floor surfacing machine comprises a first idle pulley and a second idle pulley which both are adapted to guide one of the endless power transferring means, wherein the first idle pulley is rotatable around a first idle pulley axis and the second idle pulley is rotatable around a second idle pulley axis, wherein the distance between the first and second idle pulley axes is fixed, and wherein the first and second idle pulley axes are pivotable around a common pivot axis.

5. The floor surfacing machine according to claim 4, wherein the first idle pulley has a first idle pulley axle through which the first idle pulley axis runs, wherein the second idle pulley has a second idle pulley axle through which the second idle pulley axis runs, and wherein the first and second idle pulley axles are attached to a holding means that is pivotable around the common pivot axis.

6. The floor surfacing machine according to claim 5, wherein the holding means comprises a tongue part that is movable between a first resilient part and a second resilient part, and wherein the holding means comprises a plate.

7. The floor surfacing machine according to claim 5, wherein the holding means comprises a tongue part that is held between, and in contact with, a first resilient part and a second resilient part, wherein the holding means comprises a plate.

8. The floor surfacing machine according to claim 4, wherein the first and second idle pulleys are adapted to guide the first endless power transferring means, wherein the first pulley is positioned between the first and second idle pulleys and the second pulley such that a distance between any one of the first and second idle pulley axes and the second axis exceeds a distance between any one of the first and second idle pulley axes and the first axis.

9. The floor surfacing machine according to claim 8, wherein the first pulley is positioned between the common pivot axis and the second pulley such that a distance between the pivot axis and the second axis exceeds a distance between the pivot axis and the first axis.

10. The floor surfacing machine according to claim 8, wherein the common pivot axis runs through a pivot axle that is positioned between the first and second idle pulleys.

11. The floor surfacing machine according to claim 10, wherein the pivot axle comprises an elastomeric insert that provides an elastic fastening of the pivot axle relative the first axis and the second axis.

12. The floor surfacing machine according to claim 4, wherein the common pivot axis is the first axis.

13. The floor surfacing machine according to claim 4, wherein the first and second idle pulleys are adapted to guide the first endless power transferring means, wherein the first pulley and the second pulley are in contact with one side of the first endless power transferring means, and wherein the first and second idle pulleys are in contact with an opposite side of the first endless power transferring means.

14. The floor surfacing machine according to claim 1, wherein the second distance falls below the third distance.

15. The floor surfacing machine according to claim 1, wherein the second distance equals the third distance.

16. A floor surfacing machine comprising:
a frame that is carried by at least two wheels;
a motor; and
a tool holder disc adapted to be driven by the motor,
wherein the motor comprises a motor axle that is rotatable about a first axis and is connected to a first pulley that is arranged to drive a first endless power transferring means that further is adapted to drive a second pulley that is connected to an intermediate part that is rotatable about a second axis, wherein a first pulley axle runs along the second axis in the intermediate part, wherein the intermediate part further is connected to a third pulley that is mounted closer to the tool holder disc than the second pulley, and that is arranged to drive a second endless power transferring means that further is adapted to drive a fourth pulley that is connected to a second pulley axle that is rotatable about a third axis, wherein the second pulley is coaxial with both the intermediate part and the third pulley along the second axis, where the second pulley axle is adapted to propel the tool holder disc, wherein the first axis, the second axis and the third axis are all adapted to run mutually parallel such that there is a shortest first distance between the first axis and the third axis, such that there is a shortest second distance between the second axis and the third axis, and such that there is a shortest third distance between the first axis and the second axis, wherein the first distance falls below the third distance, and wherein the third distance exceeds the second distance.

17. The floor surfacing machine according to claim 16, wherein the first axis is arranged behind the third axis, and wherein the third axis is arranged behind the second axis relative a forward running direction of the floor surfacing machine.

18. The floor surfacing machine according to claim 16, wherein the first distance falls below the second distance.

19. The floor surfacing machine according to claim 16, wherein the first and second endless power transferring means are endless belts.

20. The floor surfacing machine according to claim 19, wherein the first and second endless belts are of a Poly V-type and have a PK dimension.

\* \* \* \* \*